United States Patent
Ishii

(10) Patent No.: US 9,127,548 B2
(45) Date of Patent: Sep. 8, 2015

(54) 3-STROKE/6-STROKE ROCKET JET ENGINE

(75) Inventor: Takeshi Ishii, Honolulu, HI (US)

(73) Assignees: Arthur Ryuji Ishii, Honolulu, HI (US); Takeshi Ishii, Honolulu, HI (US)

( * ) Notice: Subject to any disclaimer, the term of this patent is extended or adjusted under 35 U.S.C. 154(b) by 0 days.

(21) Appl. No.: 14/002,908

(22) PCT Filed: Mar. 21, 2012

(86) PCT No.: PCT/JP2012/057107
§ 371 (c)(1),
(2), (4) Date: Sep. 3, 2013

(87) PCT Pub. No.: WO2012/128267
PCT Pub. Date: Sep. 27, 2012

(65) Prior Publication Data
US 2013/0333553 A1    Dec. 19, 2013

(30) Foreign Application Priority Data
Mar. 23, 2011    (JP) .................. 2011-065097

(51) Int. Cl.
*F01C 1/08* (2006.01)
*F01C 1/24* (2006.01)
(Continued)

(52) U.S. Cl.
CPC ... *F01B 3/00* (2013.01); *F01C 1/20* (2013.01); *F01C 1/36* (2013.01); *F02B 53/00* (2013.01); *F01C 1/28* (2013.01); *F02B 75/021* (2013.01); *F02B 2075/026* (2013.01); *Y02T 10/17* (2013.01)

(58) Field of Classification Search
CPC .............. F01B 3/00; F01C 1/20; F01C 1/08; F01C 1/28; F02B 2075/026

USPC ............... 418/196, 27, 9, 126, 164, 205, 104; 123/45 R, 56.1, 200, 241, 246, 249, 39
See application file for complete search history.

(56) References Cited

U.S. PATENT DOCUMENTS 104,469 A * 6/1870 Leuchtweiss ................. 418/191
805,552 A * 11/1905 Hofe ............................ 418/191
(Continued)

FOREIGN PATENT DOCUMENTS

DE    395976    5/1924
DE    658152    3/1938
(Continued)

OTHER PUBLICATIONS

English Translation of DE3313592 by Espacenet Machine Translation, Eiermann Dankwart, Oct. 18, 1984.*
(Continued)

*Primary Examiner* — Mary A Davis
*Assistant Examiner* — Deming Wan
(74) *Attorney, Agent, or Firm* — Rankin, Hill & Clark LLP

(57) ABSTRACT

The present invention provides an engine pump that has: a housing having a cylinder space; an output shaft unit formed with one or more pistons capable of constant velocity true-circle rotation within the cylinder space, a ring disk, and an output disk; a rotor capable of constant velocity true-circle rotation at a fixed relative rotational velocity with respect to the rotation of the pistons; a rotor guide, which is concentric with the output shaft unit, governs the inside of the aforementioned cylinder, has a retaining part that makes concave contact with the rotor and has an outer circumferential surface that makes surface contact with the pistons, and supports the rotor and the center of the output shaft unit which rotates at constant velocity in a true circle; and a drive means that actuates the pistons. A portion of the inner circumferential wall surface of the cylinder of the housing has a notch part that is used for sealing and makes surface contact with a portion of the outer circumferential surface of the rotor.

16 Claims, 12 Drawing Sheets

(51) Int. Cl.
*F04C 2/00* (2006.01)
*F04C 18/00* (2006.01)
*F01C 1/18* (2006.01)
*F01C 1/00* (2006.01)
*F01B 3/00* (2006.01)
*F02B 75/18* (2006.01)
*F02B 19/00* (2006.01)
*F02B 53/00* (2006.01)
*F01C 1/20* (2006.01)
*F01C 1/36* (2006.01)
*F02B 75/02* (2006.01)
*F01C 1/28* (2006.01)

(56) References Cited

U.S. PATENT DOCUMENTS

| | | | | |
|---|---|---|---|---|
| 1,059,637 | A * | 4/1913 | Reoen | 418/191 |
| 1,348,675 | A * | 8/1920 | Weed | 418/36 |
| 1,485,414 | A | 3/1924 | Junkers | |
| 2,344,879 | A | 3/1944 | Johnson | |
| 2,638,848 | A * | 5/1953 | Johnson | 418/191 |
| 3,867,912 | A * | 2/1975 | Parr et al. | 123/238 |
| 3,924,980 | A * | 12/1975 | Gordon | 418/191 |
| 3,958,421 | A * | 5/1976 | Kelly | 60/517 |
| 4,002,033 | A | 1/1977 | Welch | |
| 4,464,102 | A * | 8/1984 | Eiermann | 418/179 |
| 4,490,101 | A * | 12/1984 | Wankel | 418/164 |
| 5,375,987 | A * | 12/1994 | Brent | 418/227 |
| 6,955,153 | B1 | 10/2005 | Peitzke et al. | |
| 2005/0109310 | A1* | 5/2005 | Duncan | 123/241 |
| 2005/0284439 | A1 | 12/2005 | Peitzke et al. | |

FOREIGN PATENT DOCUMENTS

| | | | |
|---|---|---|---|
| DE | 675500 | 5/1939 | |
| DE | 3313592 A1 * | 10/1984 | F04C 18/20 |
| FR | 823356 | 1/1938 | |
| FR | 1206342 | 2/1960 | |
| GB | 418439 | 10/1934 | |
| GB | 502405 | 3/1939 | |
| GB | 515988 | 12/1939 | |
| GB | 524503 | 8/1940 | |
| GB | 527867 | 10/1940 | |
| GB | 551482 | 2/1943 | |
| WO | 84/02160 | 6/1984 | |

OTHER PUBLICATIONS

Decision to Grant issued on May 1, 2013 for the corresponding Japanese patent Application No. 2013-505974.
International Search Report dated Jun. 12, 2012 filed in PCT/JP2012/057107.
Extended European Search Report dated Oct. 8, 2014 issued in the European patent application No. 12759931.4.

* cited by examiner (a)

(b)

(c)

(a)

(b)

(c)

(d)

(a)

(b)

(a)

(b)

(a)

(b)

3-STROKE/6-STROKE ROCKET JET ENGINE

TECHNICAL FIELD

Ten years have already passed in the $21^{st}$ century, but various unsolvable problems yet remain in the current combustion systems with four strokes (intake, compression, combustion, and exhaust) or less, which is the base of all the engines except rocket engines, and limitation is recognized in competition among external post-treatment devices so as to achieve complete combustion=detoxifying except a jet engine. In such circumstances, a breakthrough technology to those problems is in high demand. The circumstances of the jet engine incapable of post-treatment will become more serious in the future but have been already given up in a sense, and governments and media seem to avoid taking up the seriousness. How many eco-cars in fuel cost does reduction of a fuel cost for a jumbo jet by half correspond to?

Assuming that an average household car runs 12000 km per year and 10 km per liter, 1200 liter of fuel is consumed a year. A jumbo jet consumes fuel of 100 times thereof in one single flight from Tokyo to Los Angeles.

Moreover, 60% of the maximum efficiency (cruising) is continuously consumed during idling.

There comes a jet engine system not requiring an external post-treatment device, which is an internal-combustion engine type rocket jet engine of various $21^{st}$ century designs. In this type of jet engine system, to the contrary to the four strokes of the current engine, that is, intake, compression, combustion, and exhaust, highly air-tight three-stroke/six-stroke system of isokinetic circular rotation three strokes (increasing-volume, constant-volume, decreasing-volume), that is, a basic principle of (intake, complete gasification, and compression) (combustion, complete combustion=detoxifying and exhaust) is used such that an in-cylinder increasing/decreasing pressure extended in seven directions like a seven-colored rainbow acts perpendicularly from a piston to an output shaft directly and gives a rotating force.

Particularly, it is said that there is no other way for purification of a jet engine but this engine system.

The present invention was made to eliminate risk of explosion by changing a liquid fuel for a space shuttle (HH+O) to a high-pressure/low-pressure gas type (HHO), to lower high-performance engines exclusively for an aircraft in a sense to the ground by reducing the size and realizing simplified detuned-up version (high-speed suppression and low-speed performance improvement type) of a rocket engine and a jet engine for a jumbo jet and to offer the inexpensive, safe, high-performance, no-pollution, and fuel-cost saving engine for use by general public.

In more detail, the present invention relates to various types of a speed-volume type, isokinetic and circular rotation type internal combustion engine type 3-stroke/6-stroke rocket/jet engine and a pump which operates only by isokinetic circular rotation similarly to the jet engine, has no pressure leakage even during super-low speed rotation, a combustion gas pressure and the like acting on a piston without waste, works with a high torque, having a highly air-tight pressure boundary, and is excellent in high-speed and super-low speed limitation performances, silence and fuel-cost saving performance.

BACKGROUND ART

Conventionally, various types of engines have been widely employed in many fields such as railways, ships, automobiles, aircrafts, power generation institutions and the like except aeronautics.

For example, super-high rotation/super-high output jet engines for aircraft which are the most excellent in performance weight and super-low rotation/super-high torque and super-long stroke diesel engines for super-large sized ships boasting excellent heat efficiency though the size and weight are large are situated at opposite extremes. Moreover, further super fuel-cost saving and super low-pollution realized by higher efficiency are in demand. However, the engines developed so far have costs increased due to addition of more complicated structures and components and some excellent properties at the cost of other performances, and an engine excellent in comprehensive performances in total has not been achieved yet.

Turning to the future, a $21^{st}$ century type MYT engine, which is a reciprocating engine considered to be the reincarnation of a volume-type air-cooling radial engine and won the invention grand price in a world-class design contest for creating the future of the $21^{st}$ century, needs 4 pistons at the minimum and 16 movable components attached thereto and has considerably complicated operating mechanisms and movements. The MYT engine is excellent in ensuring compression and realization of circular operation of a piston but its movement is indefinite-speed circular rotation including stop and is incapable of isokinetic circular rotation. The pistons of the odd-number set and the even-number set of the MYT engine do not reciprocate but repeat stop and go, stop and go . . . alternately. In this process, a cycle in which rotary moment is canceled and go is repeated, which is wasteful, durability and efficiency deteriorate, and the current state is far from ideal. Moreover, the MYT engine seems to be suitable for small to medium-sized targets and to unavoidably have a range similar to that of the original air-cooling radial engine with limited applications to some degree.

Other, various types of rotary engines have been proposed, but a complete compression requirement has not been established yet in any of the volume type, and isokinetic circular rotation and continuous combustion has not been established yet in the speed type, and thus, any ideal condition has not been satisfied yet.

As described above, compression leakage, high-pressure gas leakage or the like occurs and isokinetic circular rotation cannot be made in the prior-art technologies. Thus, development of an engine which can pursue simplification and new possibilities and has diversified characteristics is expected.

The Japanese government has declared $CO_2$ reduction by 25% over 1990 by 2020 to the world and is trying to achieve the goal by improvement and pursuit for limitation of existing technologies and austerity lives together with the industries, but that is considered to be impossible with the technical innovations in the current direction. Use of powerful motors and batteries using a large quantity of rare metal and use of precious metal for exhaust purification seem to be a waste of expensive resources.

For this reason, the basic principle having a possibility of success and aiming at least 4 to 5 times in efficiency/performance or 10 times or more than the prior-art technologies in performance for a breakthrough should replace the base which can be obtained from the past experiences.

SUMMARY OF INVENTION

Technical Problem

The present invention has an object to provide various three-stroke/six-stroke rocket/jet engines in each of a speed volume type and an isokinetic circular rotation internal combustion engine type which operates only by isokinetic circular rotation similarly to a jet engine, has no pressure leakage, has all the increased/decreased pressures applied to the piston immediately work as a rotation torque and is excellent in super-high speed and super-low speed limitation performance, silence and fuel-cost saving performances and a pump.

Means for Solving the Problems

The inventor has made a research on simplification as much as possible while merits of the reciprocating engines, rotary engines, steam engines, and electric motors only by isokinetic circular rotation similar to the jet engine are kept.

As an alternative engine succeeding the jet engine and the reciprocating engine considered to have already reached a development limit, a further keen research was made in order to provide an engine system having efficiency/performances at least 5 times or more than the current reciprocating engine.

As a result, the inventor obtained a finding that the above-described object can be achieved by an engine pump composed of a specific configuration having a characteristic that can be manufactured only by a basic lathe and milling process and inevitably using a circular shape or a shape including it as a component (other shapes or rectangular shapes can be included as necessary).

The present invention was made on the basis of the above-described finding and provides an invention having the characteristics described below.

1. An engine pump including at least:
   a housing (A) having a cylinder space;
   an output shaft unit (B) composed of one or two or more pistons, a ring disk, and an output disk capable of isokinetic circular rotation in the cylinder space;
   a rotor (C) capable of isokinetic circular rotation at a constant rotation specific speed with respect to the rotation of the piston;
   a rotor guide (D) having the same center with the output shaft unit (B), being in charge of inside of the cylinder, having a recess-surface contact holding portion with the rotor (C) and a planar contact outer peripheral surface with the piston, and supporting the center of the output shaft unit (B) and the rotor (C) making an isokinetic circular rotation; and
   driving means (E) giving an operation to the piston, characterized in that
   a cylinder of the housing (A) has a notch portion for sealing in planar contact with a part of the outer peripheral surface of the rotor (C) in a part of an inner peripheral wall surface thereof;
   the piston of the output (C) shaft unit (B) is configured to make an isokinetic circular rotation while the outer peripheral surface thereof is in planar contact with the inner peripheral wall surface of the cylinder; and
   the rotor (C) has a piston accommodating portion for accommodating the piston during the rotation thereof and is configured to send the piston to the other side of the cylinder while a distal end of the piston accommodating portion keeps a pressure boundary by linear contact with a front-and-rear surface in an advancing direction of the piston.

2. The engine pump described in the above 1, characterized in that the cylinder space in the housing (A) is formed having a substantially doughnut shape around the rotor guide (D).

3. The engine pump described in the above 1 or 2, characterized in that the output shaft unit (B) has the one or two or more pistons, the ring disk, and the output disk integrated.

4. The engine pump described in any of the above 1 to 3, characterized in that the pistons are provided in an even number, and a pair of the pistons among them are provided at positions opposing from the center of each disk.

5. The engine pump described in any of the above 1 to 4, characterized in that the housing (A) is formed of a main body portion and a side portion, and the main body portion is provided with a through port which makes a shaft portion of the output shaft unit extendable at a center part.

6. The engine pump described in the above 5, characterized in that the main body portion of the housing (A) has a base portion for installing a main body, a space is formed inside the base portion, and a system unit as the driving means is attached in the space.

7. The engine pump described in any of the above 1 to 6, characterized in that the rotor guide (D) has the outer peripheral surface thereof excluding a recess-surface contact holding portion with the rotor (C) having outer peripheral and side surfaces in three stages holding planar contact with a piston inner-diameter surface, a ring disk inner-diameter surface, and a ring disk outer side surface, respectively, and being fixed by the housing (A).

8. The engine pump described in any of the above 1 to 7, characterized in that the driving means (E) is a system unit provided at a position within a range not exceeding a length of an outer peripheral surface of the piston from a boundary portion where the rotor (C) is in planar contact with the cylinder wall surface.

9. The engine pump described in any of the above 1 to 8, characterized by being used in a three-stroke and six-stroke engine system of a speed volume type and an isokinetic circular rotation internal combustion engine type composed of an isokinetic circular rotation three-stroke system (increased amount, constant amount, and decreased amount) and a six-stroke system of (intake, complete gasification, and compression)*(combustion, complete combustion=detoxifying, and exhaust) so as to be completed singularly or by means of appropriate combination.

10. The engine pump described in any of the above 1 to 8, characterized by being used in a four-stroke engine system having one unit of the piston or two units of the rotors.

11. The engine pump described in any of the above 1 to 8, characterized by being used in a rocket combustion type, a jet combustion type internal combustion engine or internal combustion engine type rocket/jet engine.

12. An engine system characterized by being provided at least with the engine pump described in any of the above 1 to 11.

Namely, the present invention or a preferred embodiment of the present invention has the following characteristics:

(1) An internal combustion engine type rocket jet engine operated only by isokinetic circular rotation similar to the current jet engine.

(2) The engine has a pressure boundary, and all the pressure boundaries excluding a linear contact portion at the rotor leading edges (tip end of the rotor), inside the engine is composed of planar contact (face contact) and there is no pressure leakage to the outside of the engine.

(3) A force acting on a piston works at a right angle to an output shaft all the time, and since a high torque is generated from super-low speed rotation, a heavy driving device or the like is no longer needed.

(4) Basically, there is no component making a reciprocal motion or complicated movement or the like, the structure and operation thereof are simple, and two movable components only make isokeinetic circular rotation together.

(5) Combustion efficiency and mechanical efficiency are high, and even if a fossil fuel is used, a problem of pollution is very small.

(6) In the current 4-stroke cycle (hereinafter "stroke" will be omitted, and called "cycle") reciprocating engine has only two strokes of (increasing-volume or decreasing-volume) and is composed and 1=suction; 2=compression, two strokes 1 rotation, and 3=explosion; 4=exhaust, two strokes in 1 rotation, which makes 4 strokes in 2 rotations, and completes 4 cycles, and an output stroke is obtained once in every 2 rotations.

Or 2 cycle type is an output stroke once in each rotation.

On the other hand, the 4-cycle 1 piston engine of the present invention is composed of 1 output stroke in 4 rotations with and is characterized by a super-long stroke, which is considered to be advantageous in a measure for complete combustion=detoxifying.

Moreover, with 2 rotors, makes internal combustion engine type jet engine composed of one output stroke in every rotation.

(7) These engines having 2 pistons excluding the 4 cycles of the present invention are, isokinetic circular rotation internal combustion engine type, 3-stroke rocket engine, having in between of increasing-decreasing volume, (constant-volume stroke), and an internal combustion 6-stroke type complete combustion jet engine, in which all the 6 strokes of, suction/(complete-gasification)/compression* explosion/(complete combustion=detoxifying)/exhaust, are performed by output-shaft one rotation.

(8) In this 1/3 cycle open-type pressure engine among them, 1 stroke of its increasing-volume stroke is an output stroke and has one increasing-volume output stroke per half rotation, and in 1 rotation of the output shaft, the 3 strokes on the combustion side in the second half in the 6 strokes are repeated twice, and the 6 cycles are completed. That is, an internal combustion engine type external pressure type pressure engine having two increasing-volume output strokes in 1 rotation of the output shaft.

(9) Similarly, in a 2/3 cycle sealed type implosion engine, 2/3 stroke of the increasing-volume stroke and the decreasing-volume stroke is an output stroke, is of a HHO explosion combustion/vacuum/contraction type and outputs an increase and a decrease twice per half rotation. That is, this is an internal combustion engine type rocket combustion implosion rocket engine which outputs 4 times in 1 rotation.

(10) Similarly, in a 2/3 cycle sealed type heat-difference engine (thermal expansion/constant-volume/contraction); it is an internal combustion engine type external combustion heat-difference engine. That 2/3 stroke of (increasing-volume stroke) and (decreasing-volume stroke) are the output stroke and outputs twice each half rotation. That is, outputs 4 times in 1 rotation.

(11) Similarly, in a 2/3 cycle sealed type HHO implosion compression engine is an internal combustion engine type rocket combustion implosion compression rocket engine. That 2/3 cycle of (1); expansion output increasing-volume stroke of the HHO injection ignition explosion (combustion), (2) vacuum buffer constant-volume stroke, and (3) vacuum suction output decreasing-volume stroke; low-pressure fuel injection; compression stroke makes the output. That is, makes 4 outputs in 1 rotation.

(12) Similarly, in a 1/6 cycle open type complete combustion engine is completed by adding 2 additional strokes. Of; (complete gasification stroke) and (complete combustion=detoxifying stroke), to solve various problems that cannot be solved by the current 4 cycles. Not mounting post—external mounting, is missed in the four cycles were completed addition.

This is, the 1/6 increasing-volume stroke is only an output stroke and this is an internal combustion engine type 6-stroke complete combustion jet engine. Outputting once in every rotation and non-pollution/low-pollution/high efficiency can be provided safely and inexpensively as an engine for widely various things.

The above is the embodiment with preferential for small size, light weight, and simplification using only a cylinder corresponding to the combustion side of the jet engine.

(13) Similarly, in a 2/6 cycle open type continuous complete combustion engine is a super-simple 21st century internal combustion engine type twin 3-stroke independent continuous complete combustion jet engine.

Which employs a mechanism of a jet engine divided into the compression side and the combustion side as a double cylinder as it is, continuously compressing/continuously combusting by replacing a large number of turbine blades of each by two pistons each provide 2 output strokes per rotation which is excellent in super-low speed to super-high speed performances.

Originally this type is the base and can be extended to all the types.

Advantages of the Invention

According to the present invention, since the pressure boundary is generated by planar contact, complete compression can be ensured, whereby compression leakage, high-pressure gas leakage or the like does not occur. As a result, the rotation number of the jet engine that can be operated only at a super-high rotation can be lowered to 3 digits (1/1000) in this engine system, which naturally leads to fuel-cost saving and lower noise.

The degree of fuel-cost reduction is 99.9% during idling and with the current jet engine, a maximum efficiency fuel cost region is exceeded with an increase in rotation of approximately twice, but the fuel cost can be reduced by 99% in an increase in rotation of 10 times and 9.9% in an increase in rotation of 100 times. Even if the rotation is raised to 1000 times, it is substantially equal to that of the idling rotation of the current jet engine.

Moreover, in comparison with the current reciprocating engine, the fuel cost can be reduced by 90% of that during idling and the fuel cost corresponds to idling even in the limit rotation increasing by 10 times, which means 90% fuel-cost reduction. The current reciprocating engine cannot raise the rotation any more, but the engine of the present invention having the efficiency performance 5 times reaches a rotation region of 10 times more with the increase in the fuel cost by 20%, and 10 times of that is an idling region of a jet engine but can be reached without any concern as a usual rotation region.

There is naturally no cancellation of (inertia) and a rotation moment is not wasted at all but all the rotation moment becomes an effective rotary motional force, and a high torque/high output becomes larger in proportion to the size of the engine.

Thus, a required output/torque can be easily selected by fine setting of the size from super small to super large.

According to the present invention, a first aspect is a pressure engine or more accurately, a speed volume type isokinetic circular rotation internal combustion engine type or "hereinafter abbreviated as a (SV/ICR/ICE type)" external pressure open type 1/3 cycle pressure engine.

Secondly, an implosion engine is a (SV/ICR/ICE type) rocket combustion sealed type (HHO combustion/vacuum/contraction) 2/3 cycle implosion rocket engine.

Thirdly, a heat difference engine is a (SV/ICR/ICE type) external combustion sealed type (expansion/constant volume/contraction) 2/3 cycle heat difference engine.

Fourthly, an implosion compression engine is a (SV/ICR/ICE type) rocket combustion sealed type (HHO combustion/vacuum/suction injection compression) 2/3 cycle implosion compression rocket engine.

Fifthly, the 4-cycle general engine is a (SV/ICR/ICE type) jet combustion open type 1/4/4, 1/4 cycle jet engine.

Sixthly, the complete combustion engine is a (SV/ICR/ICE type) jet combustion open type multiple fuel complete combustion, intake/(complete gasification)/compression*explosion/(complete combustion=detoxifying)/exhaust 1/6 cycle complete combustion jet engine.

Seventhly, the continuous complete combustion engine is a (SV/ICR/ICE type) continuous jet combustion open type multiple diversified fuel continuous complete combustion=detoxifying, 2/6 cycle continuous complete combustion jet engine.

The present invention can be used in various forms as above.

These are all of a speed type and also of a volume type and have performances exceeding the both styles and surely the 21st century internal combustion engine is reborn of the rocket jet engine.

The space shuttle is, tremendous roared of rocket engines, and the jet engine the high rotation noise, high heat exhaust, and large amount fuel consumption, and high prices. Until the general public can be utilized safely in daily life level, version shall be de-tune-up (fast suppression, slow performance improvement type) and a small simplify was realized. Performance gap with the reciprocating engine, the difference is too large. Detuning (suppress high-speed) have done but its high performance comportment is orders of magnitude say, it can be said as a matter of course extremely.

Also, tune-up (improved low speed performance) has made eyes-popping phenomenal improvement in performance in ultra-slow.

As a specific example, the 1/3 cycle 500-cc pressure engine corresponds to about a V8 4000-cc engine having 2 combustion strokes for 1 rotation of an output shaft at present, the 2/3 cycle 500-cc implosion, heat difference, implosion compression engine corresponds to about a W16 8000-cc engine having 4 combustion strokes for 1 rotation of the output shaft at present, the 1/6 cycle 500-cc complete combustion engine corresponds to about the current straight 5-cylinder 2500-cc engine, and the 2/6 cycle 500-cc continuous complete combustion engine corresponds to about the current V10 5000-cc engine as a rough comparison. The 1-piston 1/4 cycle 500-cc engine corresponds to about a single-cylinder 500-cc engine but this type is effective as a measure against pollution but has less merit in terms of output. Moreover, the 2-rotor 1/4/4 cycle 500-cc engine corresponds to about the 4-cylinder 2000-cc engine, but by using a common housing/output shaft unit, an exhaust amount can be halved, and as a result it corresponds to about a 4-cylinder 1000-cc engine. The performances become approximately 2 to 3 times, and it is considered difficult to take a role in the future environmental/energy revolution only with this engine system.

However, the rotation limit of the current general reciprocating engine is approximately 600 rpm in idling to 6000 rpm (10 times), while the rotation limit of these engines are 0 rpm during no idling or 10 rpm in the low-speed type, 30 rpm in the medium speed type, 60 rpm in the high speed type, and to 60000 rpm and its scale is (1000 times in the high speed type, 2000 times in the medium speed type, and 6000 times in the low speed type), and the rotation number corresponds to idling of the current jet engine at 20000 to 60000 rpm.

For reference, The Chrysler tried to market once the idling of a jet-engine car is 60000 rpm, and need to rotate the engine over it, if not didn't run a car.

The jet engine, it is natural, over the idling speed is start that region of displayed it real ability.

Compared to that, present invention engine, how insane, unimaginable far, the premonition of the high performance of the bottomless.

Also for reference, although it is very hard to realize the difference between the 1000-fold, the weight of air and, water are close to exactly 1000-fold.

The difference in energy could be felt by enormous power of the horrible Tsunami. Compared to the typhoon, it looks casually, but its power was beyond imagination.

These engines are also, the same would be apply it should not difficult to imagine.

Also, according to the present invention, various and diversified types of fuels, steam, air, inactive gases, etc. can be used as an internal combustion engine and an external combustion engine and the present invention can be also operated as various types of pumps.

The present invention is a (SV/ICR/ICE type) which functions do not contain any reciprocal motion basically and as an engine and a pump which operate only through the isokinetic circular rotation without pressure leakage.

In addition, according to the present invention, by providing these engines and pumps, eventually, it is possible for us to reduce both oil dependency and $CO_2$.

BEST MODE FOR CARRYING OUT THE INVENTION

Figure 1:
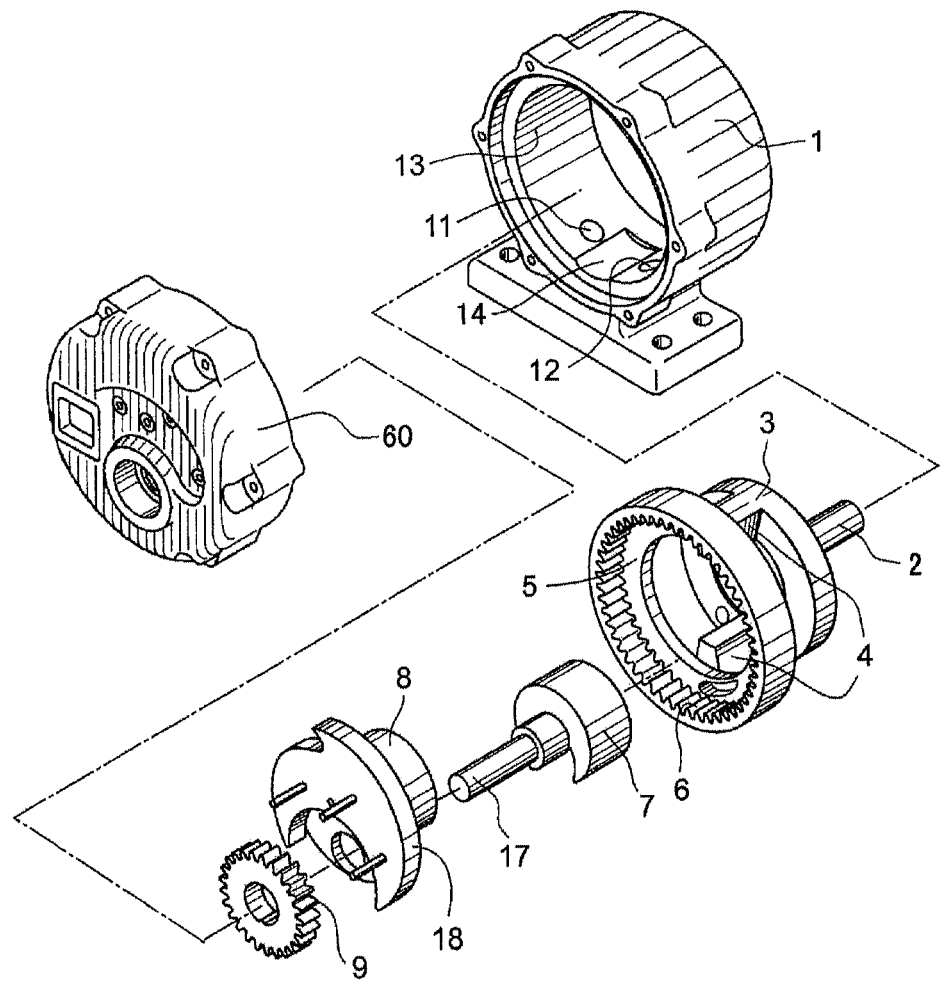
FIG. 1 is an outline exploded perspective view illustrating both engines (1/3 pressure, 1/6 complete combustion engine) in first and sixth embodiments according to the present invention.

A preferred embodiment of the present invention is an engine pump having a basic configuration described below (See FIGS. 1 to 12).

In a housing 1 forming this engine main body has an output shaft through port at the center part, a doughnut-shaped cylinder space, and a notch portion 14 for planar contact with an outer peripheral surface of a rotor 7 for sealing at a part of an inner peripheral wall surface 13, and a mounting space for a system unit 91 (See FIG. 9) for each cycle is formed inside a base for main body installation.

This output shaft unit 2 integrates an output disc 3, one or more pistons 4 at opposing positions in the case of 2 or even numbers, a ring disk 5, and a ring gear 6 (See FIG. 1).

The outer peripheral surface of the piston 4 makes an isokinetic circular rotation in planar contact with the inner peripheral surface 13 of a doughnut cylinder.

This rotor 7 makes an isokinetic circular rotation in partial planar contact with the doughnut cylinder notch portion 14, holds a constant rotation specific speed (e.g.; piston 1:2 rotor=1:2) with respect to the rotation of the piston 4 and works such that a tip end of a piston accommodating portion of the rotor 7 feeds the piston 4 to the other side of the cylinder while keeping a pressure boundary by linear contact with the front and rear surfaces of the piston 4.

A rotor guide 8 is in charge of the inside of the doughnut cylinder having the same center with the output shaft, and the outer peripheral surface excluding a recess-surface contact holding portion with the rotor 7 has outer peripheral/side surfaces in three stages keeping planar contact with the inner diameter surface of the piston 4, the inner diameter surface of the ring disk 5, and the outer side surface of the ring disk 5 and is fixed by a side housing in order to support the center of the output shaft unit 2 and the rotor 7 making the isokinetic circular rotation.

In attaching the system units for various cycles, the rotor 7 attached the various system units according to individual required performances at positions in a range not exceeding the length of the outer peripheral surface of the piston from the boundary portion in planar contact with the cylinder wall surface at 6 o'clock direction to the both sides.

As configured above, a basic and first to seventh embodiments singularly or in appropriate combination of a Speed Volume type Isokinetic Circular Rotation Internal Combustion Engine type [hereinafter abbreviated as (SV/ICR/ICE type)] various 3-stroke and 6-stroke engine pump system composed of (increasing-volume/constant-volume/decreasing-volume) isokinetic circular rotation 3-stroke system and (intake/complete gasification/compression)*(combustion/complete combustion=detoxifying/exhaust) 6-stroke system are provided.

As well as, 1-piston or 2-rotors, there are provided an engine pump system to be four strokes.

These are rocket combustion type/jet combustion type internal combustion engines or an internal combustion engine type rocket jet engine pump.

[First Embodiment]

The present invention provides a pressure engine as a first embodiment. This first embodiment is configured basically as a super-strong torque oriented (volume type) super long stroke diesel engine for a super-large sized ship the most excellent in heat efficiency/fuel cost performance and a super-strong horse-power oriented (speed type) jet engine for the aircraft the most excellent weight-performance which overcome their limits and can achieve 5 times or more or 10 times of the current reciprocating engine. As comparable to the industrial revolution, the Environment and Energy as the Motive force of the Revolution, it is an invention that is configured with an emphasis on whether or not to withstand its responsibility.

This configuration is also applied to all the other embodiments which will be described later in the present invention.

FIG. 1 is an outline exploded perspective view illustrating a pressure engine of the first embodiment and a complete combustion engine in the sixth embodiment according to the present invention with the components exploded.

In this, a single-cylinder final type 1/6 cycle engine with an emphasis on low-speed performance is directly provided with a pressure introduction port 11 and an outlet 12 for 1/3 cycle.

Moreover, for pressure, implosion, and implosion compression, a large and heavy ring gear/sync gear is omitted, and a light-weighted compact design incorporating a sync gear set inside a power disk is completed and can be extended to all the engines including 2/3, 1/4, 1/6, and 2/6 cycles so as to achieve smaller size, lighter weight and higher performance.

In a pressure engine 19 in this first embodiment, in addition to the above-described basic configuration, the pressure introduction port 11 for taking in a pressure into the cylinder from the outside and the pressure outlet 12 for emitting the pressure to the outside from the cylinder are directly provided or a system unit for pressure provided with an instant-change-valve is attached with them so that instant reverse is possible.

An external pressure open type 1/3 cycle pressure engine pump (SV/ICR/ICE type) is provided which is characterized by providing driving means composed of a stroke for giving a rotating operation to the piston by means of pressure injection through the pressure introduction port 11 and pressure emission from the pressure outlet 12. As the pump, is established by the external force, to rotate.

Manufacture of the engine in this first embodiment needs only a basic lath and a milling machine. A section of a specific component can be designed having an inevitable circular shape and a shape including that, and other rectangular shapes and the like can be freely designed. This also applies to all the other embodiments in the present invention which will be described later.

The pressure engine 19 of this first embodiment is, as illustrated in FIG. 1, composed of the following components:
1=housing (cylinder)
2=output shaft unit (=Output disk 3+piston 4+ring 5+ring gear 6 are integrated)
3=output disk
4=piston
5=ring disk
6=ring gear
7=rotor
8=rotor guide (3-staged outer diameter)
9=sync gear,
Side housing (not shown);
Instant-change-valve (not shown)
11=pressure introduction port
12=pressure outlet
13=cylinder inner peripheral wall surface
14=cylinder notch portion for rotor planar contact;
System unit for pressure (not shown)
18=rotor guide wall portion (3-staged outer diameter)
19=1/3 cycle pressure engine (1) In the cylinder inner peripheral wall 13 of an inner peripheral wall surface circular doughnut-shaped cylinder of the housing 1 forming the engine outer wall, the introduction port 11 for taking in the pressure and the outlet 12 for emitting the pressure inside are provided, and at a position in the intermediate bottom portion (6 o'clock), the notch portion 14 is formed along a rotational trajectory of the outer peripheral surface of the rotor 7.

(2) The output shaft unit 2 is completed by integrating a pair of pistons 4 and 4 at opposing positions from the center of the output disk 3, the ring disk 5, and the ring gear 6.

Then, a 3-cycle motion of the isokinetic circular rotation from the output/increasing-volume stroke by the pressure injected from the pressure introduction port 11 to the buffer constant-volume stroke for keeping it constant and emission to the outlet 12 by the discharge/decreasing-volume stroke is continued.

(3) The rotor 7 engaged with the piston 4 is slightly larger than a half of a piston outer peripheral diameter and that portion bites into the cylinder wall surface (in the case of the ring gear type) and realizes planar contact.

Moreover, rotation is made at a rotation specific speed of piston 1:2 rotor, a piston accommodating space having a circular section is provided inside, and the tip end of the accommodating portion acts to feed the piston to the other side of the cylinder while being in linear contact with the front and rear surfaces of the piston 4.

(4) The rotor guide 8 has the same center as the output disk, has an arc-shaped notch portion along the circular rotation trajectory of the rotor 7, the outer peripheral surface on the first stage thereof being in planar contact with the inner peripheral surfaces of the pistons 4 and 4 so as to ensure the pressure boundary.

(5) The outer peripheral surface on the second stage is in planar contact with the inner peripheral surface of the ring disk.

(6) The outer peripheral side surface on the third stage is in planar contact with the side surface of the ring disk.

(7) On the outside opposite to them, an accommodating space for a sync gear 9 is provided.

(8) The side housing for accommodating each of the predetermined members arranged in the housing 1 and fixing them at a fixed position (the side housing 60 used in the sixth embodiment is illustrated in FIG. 1, but a side housing similar to that except that an intake port is not provided in the first embodiment is used) is provided.

Figure 9:
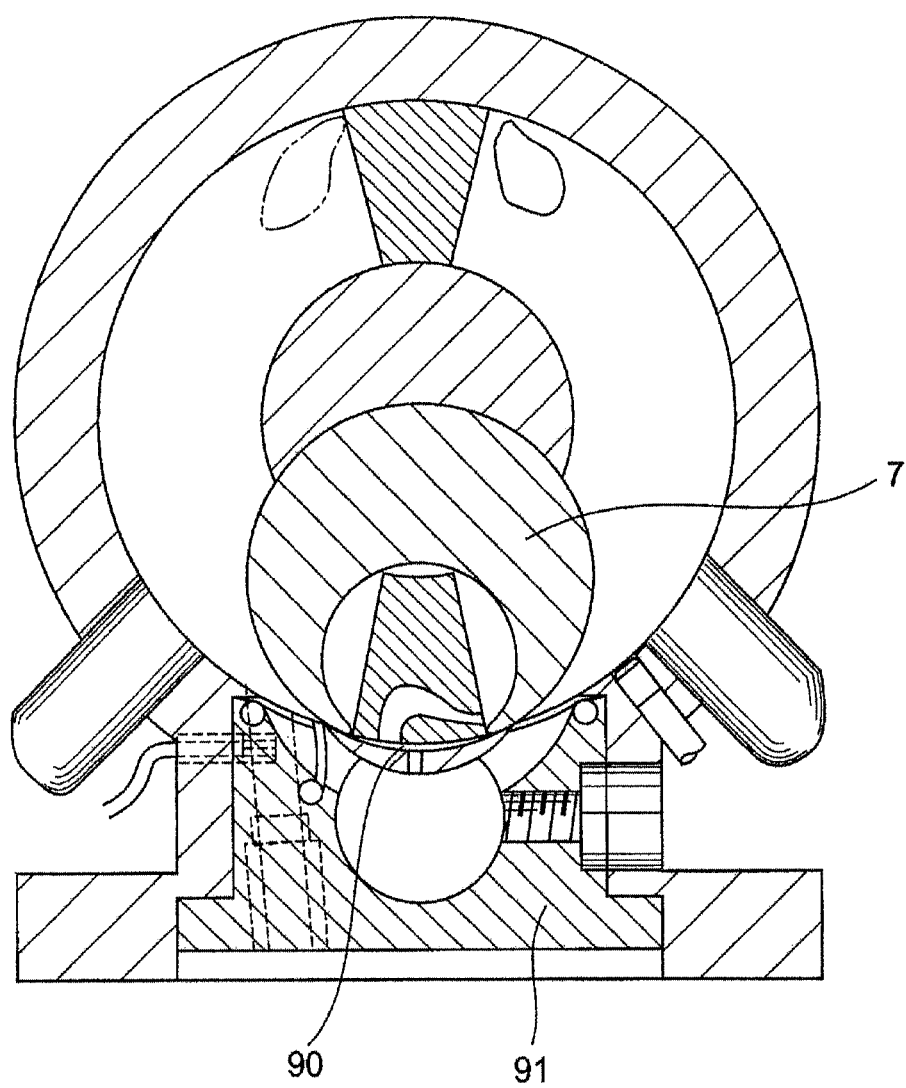
FIG. 9 is an outline explanatory diagram for explaining the engine in each embodiment according to the present invention.

The above characteristics of the engine pump of the present invention are configured in all the embodiments and operated while forming a gap 90 since a trajectory of the rotor 7 and the trajectory of the piston are different from each other (See FIG. 9). FIG. 9 is an outline explanatory diagram for explaining the engine in each of the embodiments for facilitating understanding of the characteristics of the present invention, and a system unit 91 is cited as an example provided with a structure dedicated for each and employed for various engines such as implosion, heat difference, implosion compression, complete combustion, and continuous complete combustion which will be described later.

It should be noted in FIG. 1, in order to facilitate explanation of the internal configurations of the pressure engine in this first embodiment and the complete combustion engine in the sixth embodiment which will be described later, an exploded perspective view is used. Moreover, in FIG. 1, a rectangular intake port of the side housing 60 for the complete combustion engine is provided and an inlet is provided in the ring disk 5 and an outlet is provided in the output disk 3 of the output shaft unit 2.

They are not for this first embodiment but are required for the complete combustion engine in the sixth embodiment which will be described later.

The pressure engine in this first embodiment is, as described above, configured such that all the pressure boundaries become planar contact except the rotor leading edge, whereby no pressure leakage is caused, and thus, the applied pressure all work directly and moreover orthogonally to the piston 4 and immediately act as a rotation torque.

The only linear contact pressure boundary portion is inside the engine, and the pressure does not leak to the outside of the engine or there is no leakage of a combustion gas. Not only the current jet engine but the reciprocating engine and the rotary engine also have them overlapped, and considering non-contact/non-boundary, the pressure engine is superior by one or two ranks. As a result, more reliable and stable operation is possible, the output increases substantially in proportion to the engine revolution number from the super-low rotation high torque, and the rotation limit is equal to that of the jet engine. From this fact, since the output increases in proportion from the super small size to the super large size, fine handling can be made easily. The same applies to all the other embodiments which will be described later in the present invention. Idling is not needed, and similarly to a steam engine, with a stop state at 0 rotations when the maximum torque is exerted as 1 rotation per minute, rotation 1000 to 2000 times of that is sufficient. As compared with the fact that the volume-type current engine can raise the rotation only 10 times from idling, how impressive the 1000 to 2000 times is can be easily understood (assuming that 1 rotation makes an advance of 1 m, it is equal to 1 to 2 km/minute or 60 to 120 km/hour, and this is 180 km/hour at 3000 rotations and 360 km/hour at 6000 rotations which is close to the rotation limit of the reciprocating engine. This is equal to V8 4000-cc sports car.)

Evidently, the pressure engine has the rotation limit which can easily exceed 100000 rpm. For automobiles, the pressure engine does not need a heavy transmission or back gear similarly to a steam automobile in the past, and backward movement can be easily made by switching an instant-change-valve.

The basic principle also applies to each of the embodiments which will be described later as in this embodiment.

This engine system is, as described in the above-described configuration, designed such that all the pressure boundaries are configured by planar contact except the rotor leading edge and thus, a phenomenon in which air does not leak or there is no compression leakage or combustion gas leakage even without contact occurs at the time when a certain speed is reached. Thus, design on the premise of no contact and no compression leakage can be considered to be made from the beginning. The minimum piston speed rotation when the phenomenon occurs can be idling rotation in the heat difference, general, and complete combustion engines, and a design in pursuit of 0 (zero) frictional loss as much as possible can be considered to be made.

The housing 1 used in this pressure engine 19 becomes an outer wall of the main body and a base for installation, and the inside forms a circular doughnut shaped cylinder with each component. Regarding this housing 1, an internal end face, a hole for an output shaft and a circular cylinder inner peripheral wall surface 13 are finished by a lathe and the like. Moreover, the notch portion 14 with which the rotor 7 is brought into planar contact is provided at the position of 6 o'clock, and various system unit installation portions having a common size may be provided within a range not exceeding the length of the piston outer peripheral portion or milling can be directly applied on the both sides thereof.

Figure 2:
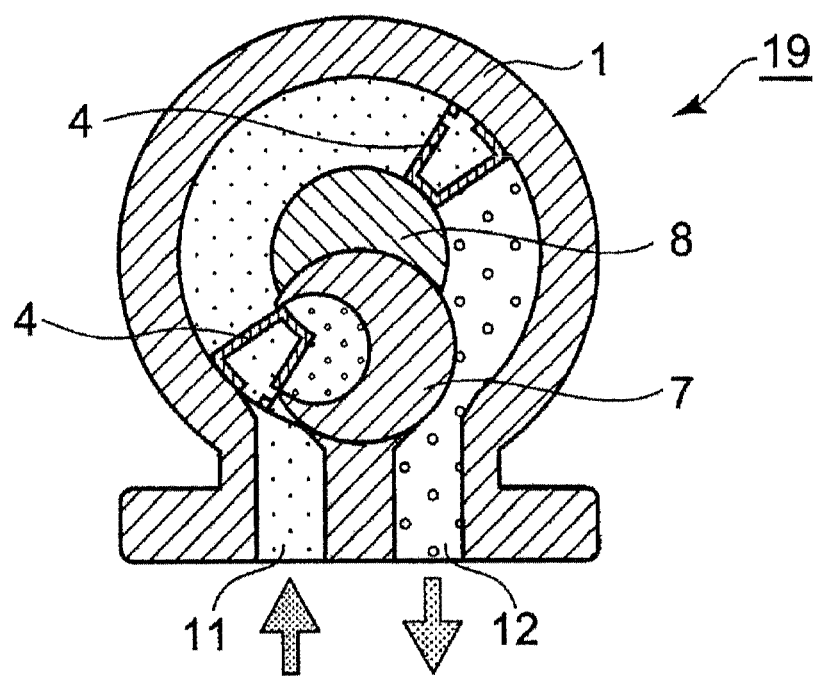
FIG. 2, FIG. 3 and FIG. 4 are the sectional view illustrating a part of an operation stroke of the pressure engine of the first embodiment according to the present invention.

As illustrated in the sectional view in FIG. 2, by directly providing the introduction port 11 for taking in the pressure from the outside and the outlet 12 for emitting the pressure to the outside, this engine can be manufactured inexpensively as a single type.

Since any material/manufacturing method can be applied to these engines, they are suitable for mass production.

The outer periphery of the output shaft unit 2 used in this pressure engine 19 is capable of planar contact and isokinetic circular rotational motion along the inner peripheral wall surface 13 of the housing 1, and the ring gear 6 for synchronization and the sync gear 9 making a pair having a gear ratio of 2:1 are used.

The rotor shaft 17 and the sync gear 9 integral with the rotor 7 are fixed by a key, and by meshing the ring gear 6 with the sync gear 9, synchronous rotation is made at a constant rotation of the ring gear 1:2 the rotor.

As the two pistons 4 and 4, a piston having a cavity inside for efficiency improvement and a hole leading to the outside is provided each in a rear part and an outer peripheral part is used. Though efficiency lowers, these cavity and holes do not have to be necessarily provided in the engines other than those in the fifth and sixth embodiments, and a piston without a cavity part inside can be also used. Moreover, the piston having a shape expanded by 25° from the center of the output disk is used for the piston 4, but this is not limiting and is capable of a change as appropriate.

The rotor 7 used in this pressure engine 19 is similar to the rotor 7 in the above-described basic configuration.

This rotor 7 in the present invention acts to feed the piston 4 to the other side of the cylinder while in planar contact with the cylinder surface notch portion 14 and in linear contact with the front and rear surfaces of the piston 4 at the distal end of the accommodating space in the rotation operation.

The rotor guide 8 is fixed with the wall portion 18 which closes the cylinder inside the side housing, and the rotor shaft 17 is combined with the sync gear 9 and penetrates the hole of the wall portion 18 and goes out of the side housing. In the side housing, a through hole and an internal end face of the rotor shaft 17 are finished by lathe machining.

Figure 3:
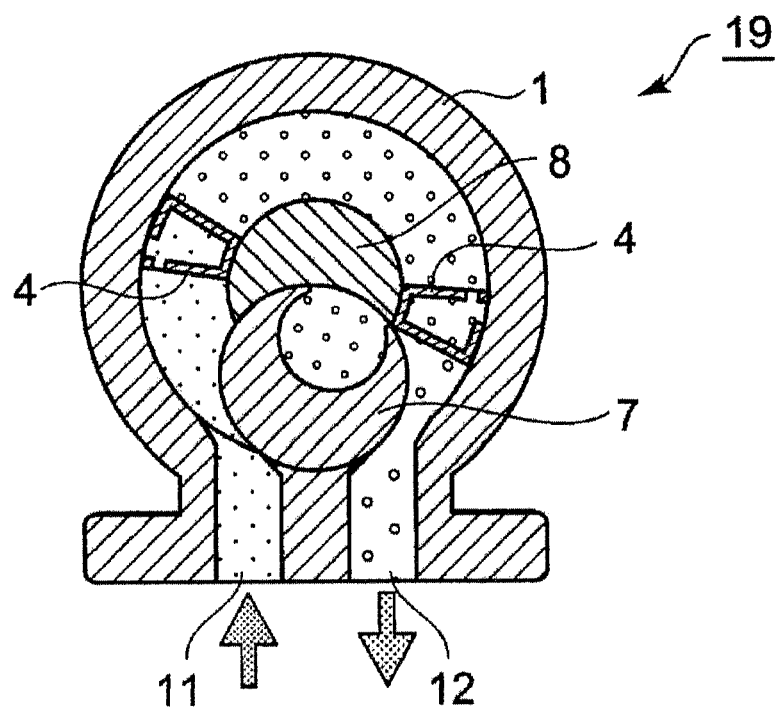
Figure 4:
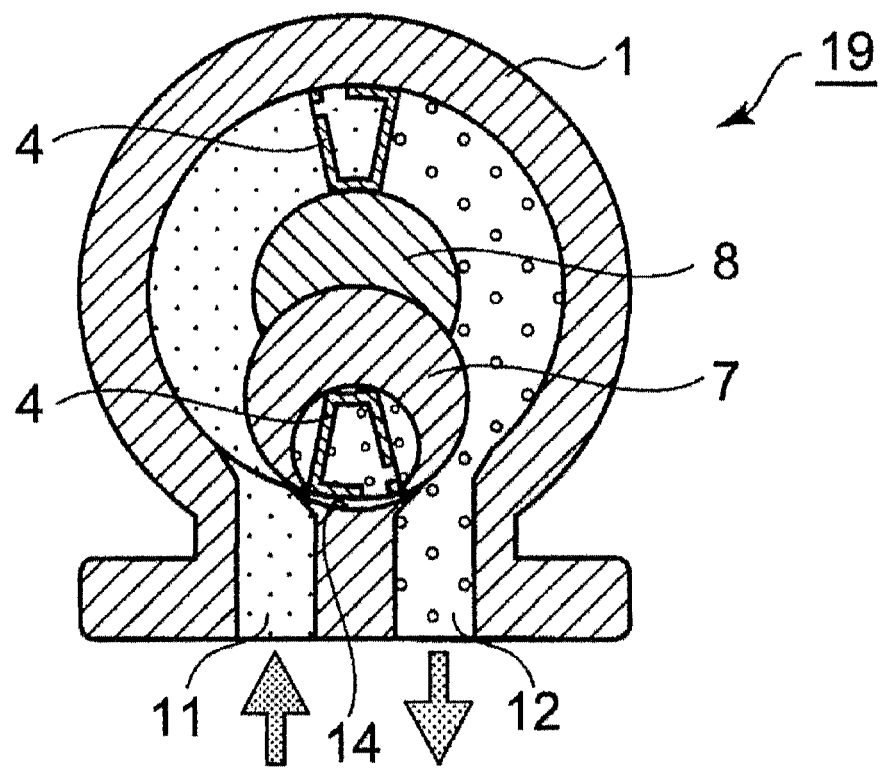

Next, an operation of the pressure engine of this first embodiment will be described by referring to the drawings. FIGS. 2 to 4 are sectional views illustrating an operation process of the pressure engine in time order.

The position of a structural member is expressed by the unit of a clock (the same applies to the following embodiments).

First, FIG. 2 illustrates that a pressure-injection increasing-volume output stroke is to start in the lower piston 4 around 7 to 8 o'clock, while a space sandwiched by that and the upper piston 4 around 1 to 2 o'clock is in a buffer stroke in constant-volume movement to lower an exhaust noise, the upper piston front surface is during a decreasing-volume discharge stroke, and an excess pressure is emitted to an exhaust port.

The subsequent FIG. 3 illustrates that the increasing-volume output stroke has advanced by the pressure injection at past 9 o'clock, the space of the right and left pistons 4 and 4 is still in the buffer stroke in the constant-volume movement, emission on the piston front surface at past 3 o'clock has finished, and the remaining is discharged by means of an edge of the rotor 7.

In the last FIG. 4, approximately a half rotation (by 140 degrees) has been made clockwise, and an instant composed of just 2 strokes, that is, the increasing-volume output stroke and the decreasing-volume exhaust stroke is shown.

After that, the piston enters the same state as the first piston, that is, as in FIG. 2, and this rotation is repeated.

This first embodiment can provide an external pressure type pressure engine which has a perfect pressure boundary by planar contact, operates only by the isokinetic circular rotation, includes only 2 movable components, does not need fuel only if there is a supply pressure and can effectively utilize a low pressure that cannot be operated in a turbine type.

The pressure engine of this first embodiment is a low rotation/high torque, high rotation/super-high output (SV/ICP/ICE type) and can provide a pressure engine pump having a high-speed rotation/durability equal to those of the jet engine, utilizing pressures of air, gas, steam, water, oil and the like and replacing the current low rotation/extremely-low performance, super-high rotation/high output speed type turbine engine pump.

This pressure engine is small-sized, light-weighted, simple and inexpensive and highly usable as compared with the turbine type as a power generation system for converting an excess steam, high-pressure air, high-pressure gas and the like discarded in plants and the like to power. Moreover, the pressure engine realizes a high-torque and reliable operation to various air tools, rotating washing brushes and the like using free piped water/pressure as well as cost reduction and increased durability.

There are various and versatile engine application systems and the like and an air/steam engine system that can be used as an eco car, for example, and the like can be provided.

This pressure engine can be applied to an air car due to its favorable efficiency. If the engine of this embodiment is applied to an air car, since that is an air-car system using air and water, the system can be far more inexpensive and safe as compared with a high-torque motor using a large quantity of expensive rare metal and the like and PHV or EV using a high-performance battery and is also advantageous in terms of cost performance since all the existing infrastructure can be utilized as it is. The air car which this pressure engine is mounted, and not requiring an ignition device or the like is considered to have a performance 2 to 3 times more than that of a conventional air car.

Moreover, by combining the pressure engine with the heat difference engine, it can be used as a free energy system using solar heat.

For example, by generating solar heat difference power as a heat difference engine or by creating compressed air as a directly connected pressure pump, an air station for air cars with "0" running cost can be provided. Also, by utilizing the air station using this pressure engine pump or inexpensive night time power, a fuel cost becomes markedly smaller than gasoline, which is extremely advantageous for all the air-car owners.

The conventional air car has a 4-cylinder or 6-cylinder deformed reciprocating engine and is said to have achieved a cruising distance of 160 km, but idling is needed even during waiting for a traffic signal to change, for example, its exhaust sounds is somewhat noisy, and energy is wasted. This air car can also function with a separate gasoline engine if air in a tank is used up, and a concern of use-up of air by a user who often travels far is solved.

On the other hand, this pressure engine uses water as a preliminary power source instead of gasoline, generates low-temperature steam by any heat source/means, and changes to a steam engine as it is. Moreover, the engine is operated in a sealed circulation cycle, and a vacuum suction force when the steam is condensed into droplets is also utilized. The engine has no concern of replenishment of water and is of a fuel saving type.

Moreover, if there is a charging stand, rapid air charge is possible by using a built-in pump. Moreover, air can be also filled by night electricity at home at a discounted rate. Spread of charging stands for EV is a favorable system that can be used for air cars as they are.

It is needless to say that the tank can be filled in a couple of minutes if there is a high-pressure air station.

If an air station having free air compressed by the solar heat difference engine and this pressure pump is open to the public for free, no one would want to buy expensive gasoline. Unlike a hydrogen station, there is no risk except high pressure, and even some air leakage does not have to be worried about, and it is a system which is safer than a self-service gas station and can be used by anyone.

This first embodiment can provide an air pressure engine and a steam pressure engine and can reduce fossil fuel consumption, that is, $CO_2$ reduction and greatly contribute to reduction of $CO_2$ generated during a manufacturing process thereof.

Moreover, a simplified power generation system which can generate power efficiently by using steam, high-pressure gases, high-pressure air and the like which are discarded at present can be provided.

By utilizing this small-sized, inexpensive, low rotation, and high torque, it can be easily introduced into small-sized businesses. It can be installed and expanded anywhere as long as there are a pressure source, air, and water.

Moreover, when being used for automobiles, there are many advantageous points, as compared with an expensive and heavy high-performance batteries of EV and PHV, such that the tank is light-weighted and inexpensive, has a long life lasting for at least 50 years, its maintenance cost is low, handling is easy, deterioration does not occur, there is no concern of short-circuit, fire, or failures due to unknown causes, it is safe and secure by using only high-pressure air, and control can be made only by switching of the instant change valve and an open amount.

[Second Embodiment]

The present invention also provides, as a second embodiment, an internal combustion engine type HHO rocket combustion type implosion engine and an internal combustion engine type HHO rocket combustion type implosion compression rocket engine, but this will be described later in the [fourth embodiment].

The implosion engine of this second embodiment is an HHO rocket combustion type implosion engine using a gas of hydrogen/oxygen (HHO) obtained by electrolyzing water as a fuel and having (1) an increasing-volume output stroke repeating high-pressure/continuous fuel injection ignition/continuous explosion (combustion), (2) vacuum buffer constant-volume stroke, and (3) piston suction output decreasing-volume stroke, 2/3 stroke of which is an output stroke, in order to exceed efficiency 3 times of a ratio of a hydrogen fuel cell to a gasoline engine and to realize efficiency/performance 5 times or more.

The HHO rocket combustion type implosion engine (not shown) is achieved only by sealing the pressure engine, by providing an $H_2O$ recovery pipeline from the notch portion 14 for rotor planar contact for recovery, and by attaching a high-pressure injection nozzle and a glow-ignition plug at a position of a pressure introduction port. These are easily integrated, and conversion between implosion and pressure is realized by installing the instant change valve in the system unit or the main body.

In the implosion engine of this second embodiment, the above-described basic configuration is provided and the HHO gas high-pressure injection nozzle and the glow ignition plug is provided at a spot corresponding to the pressure introduction port 11 or a system unit for implosion is attached. This is a sealed cycle in which at the same time as the HHO gas high-pressure injection, ignition is made by the glow ignition plug, and the continuous explosion combustion/increasing-volume output stroke 1, the vacuum buffer constant-volume stroke 2 in a form sandwiched by the subsequent piston, and at the same time, the decreasing-volume stroke 3 in which the previous piston is vacuum-suctioned and outputted are repeated.

By attaching the system unit for implosion, instantaneous conversion and reversal are made possible.

This embodiment is a (SV/ICR/ICE type) rocket combustion type sealed 2/3 cycle implosion rocket engine pump characterized by providing driving means composed of strokes giving a rotational operation to the piston as above.

By using an external force, similarly to the first embodiment, a pump is realized by means of suction of a fluid during the vacuum constant-volume stroke and compression or discharge during decreasing-volume stroke as a self-powered pump.

High pressures, gas, steam, air and the like are wastefully discarded from factories and the like at present, but they should be used at that time on the spot and have time and space restrictions.

In large factories, power is generated and consumed by themselves which poses no problem, but energy is accumulated in various forms by using inexpensive nighttime power and consumed during the daytime for power use in high demand during the daytime at present. Electrolysis of water so as to take out hydrogen and to use it for a fuel cell is being examined, but a fuel cell cost is too high to be widely used.

The simple and inexpensive internal combustion type pressure/implosion (compression) engine in the same power system using hydrogen basically has an HHO gas filled in a single tank for use, but filling of a mixed gas of two kinds including HHO and the like into the tank is not allowed by law in some countries, but the gas can be used without a problem all through the world by using an oxygen tank and a hydrogen tank independently in such countries. Hydrogen has a risk of explosion and it is considered to be mad to fill it in a tank with oxygen which causes the explosion, but unless it is filled in a liquefied state, no explosion accident as the Space Shuttle would occur or to the contrary, it is confirmed in an experiment that an implosion flattens a high-pressure tank and can be safer than a gasoline tank in a sense.

Alternatively, an open type can be employed so as to function as a hydrogen engine which has the hydrogen gas react with oxygen in the air or in the air tank.

In this case, the engine is a 1/3 cycle, and performances equal to a 2/3 cycle cannot be maintained easily.

Use in a mobile body at any time and at any place is an original object, and by adding this function for a mountain road and a slope for which power is not sufficient with the engine for air car, comfortable drive can be realized.

This air pressure/HHO implosion (compression) engine car is 100% perfect non-pollution.

The same also applies to a 3-stroke implosion compression engine pump according to the fourth embodiment which will be described later.

[Third Embodiment]

The present invention also provides a heat difference engine (SV/ICR/ICE type), an external combustion type sealed heat difference engine pump as a third embodiment.

Figure 5:
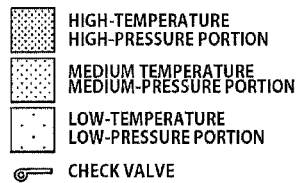
FIG. 5 and FIG. 6 are the sectional view illustrating a part of the operation stroke of a heat difference engine of a third embodiment according to the present invention.
Figure 5:
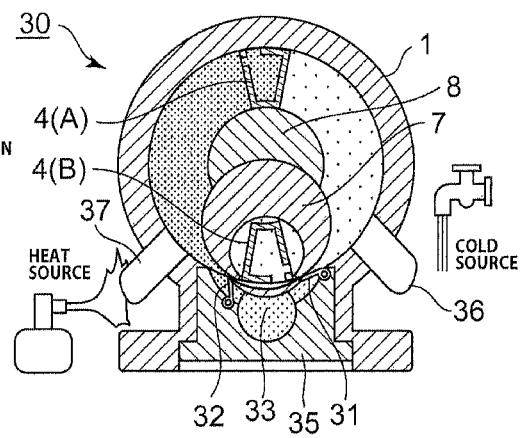
Figure 5:
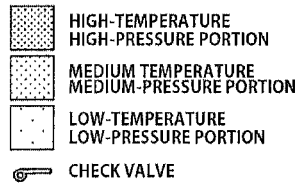
Figure 5:
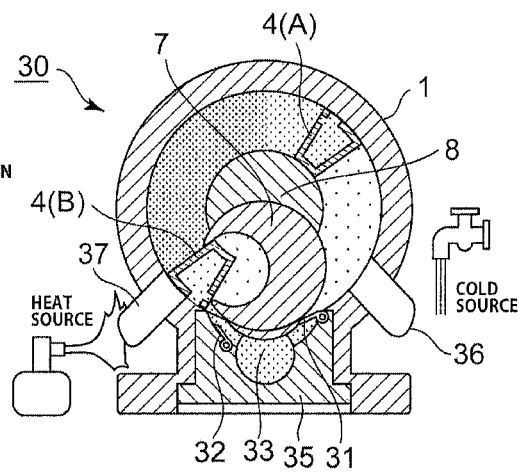
Figure 5:
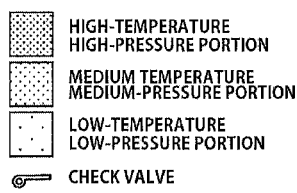
Figure 5:
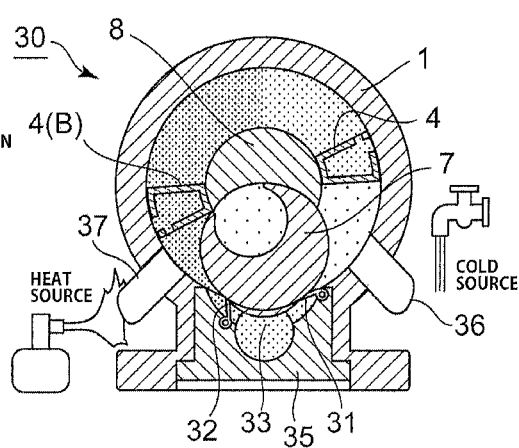
Figure 6:
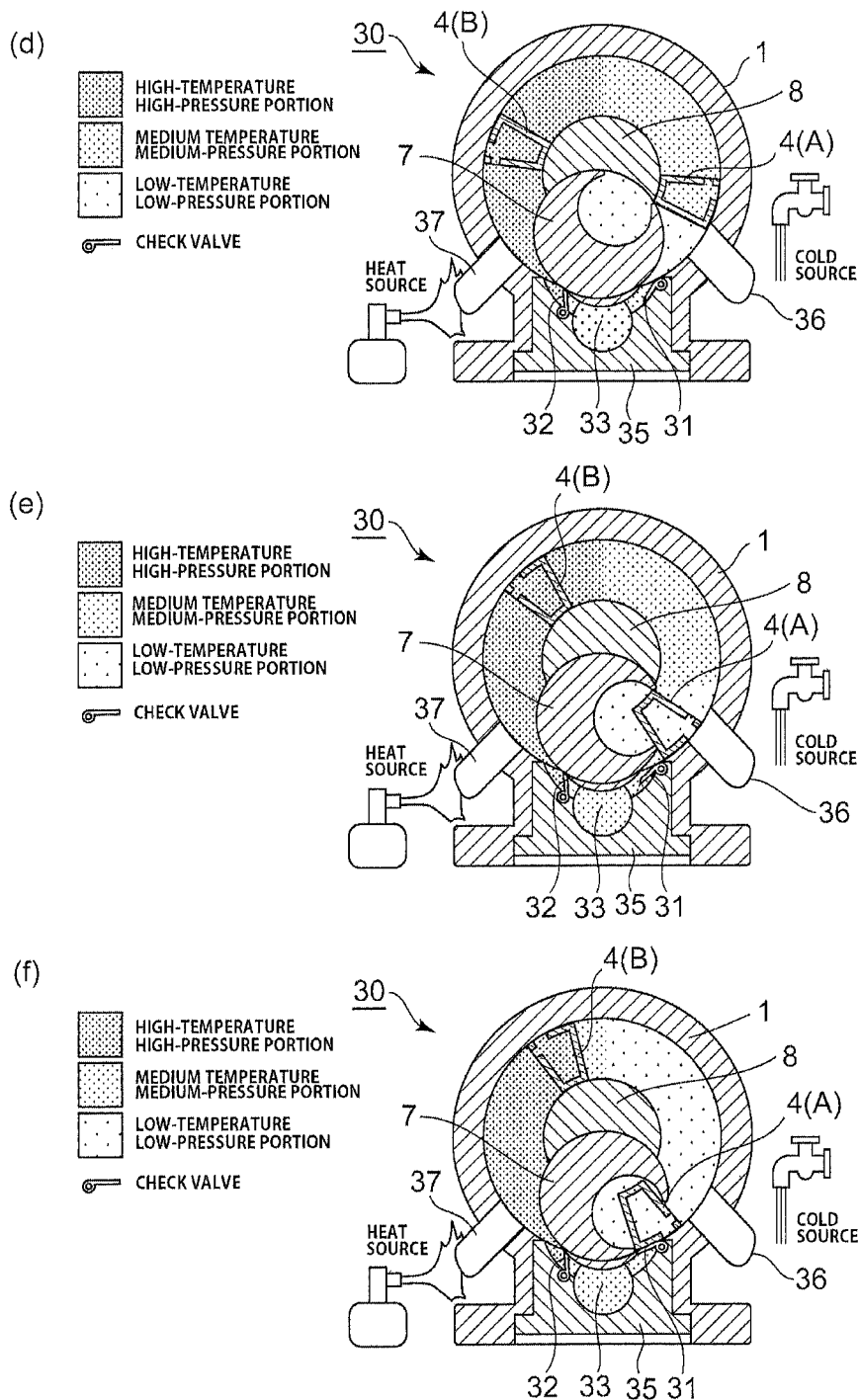

As illustrated in FIGS. 5 and 6, in the heat difference engine 30 of this third embodiment, a bypass leading to the both sides of the cylinder shut off by the rotor 7 is provided on the both outsides of the notch portion 14 of the cylinder in planar contact with an outer peripheral trajectory of the rotor 7 in the main body or in a heat difference system unit 35 and in the middle of the bypass inlet and the outlet so as to function as a buffer chamber 33. For fluid control in the cylinder, low and high-temperature side jet-check-valves 31 and 32 for low speed for preventing a backflow of the fluid flow from the bypass low-temperature side to the high-temperature side are similarly attached to the main body or the heat difference system unit 35. A low-temperature-conductor 36 is attached in the vicinity of the inlet of the cylinder inner peripheral wall bypass, and a high-temperature-conductor 37 is attached in the vicinity of the bypass outlet.

These pistons 4 are all hollow, each of which has a through port Lead to the cylinder and the rotor space on a rear surface thereof and a through port Lead to the bypass provided on the outer peripheral surface.

This is a (SV/ICR/ICE type) external combustion type sealed 2/3 cycle heat difference engine pump composed of a stroke giving a rotation operation to the piston 4 by means of temperature differences and pressure differences by the low-temperature-conductor 36 and the high-temperature-conductor 37 in the cylinder, in the piston, in the rotor, in the bypass, in the buffer chamber 33 and opening/closing control of the low-temperature jet-check-valve 31 and the high-temperature jet-check-valve 32.

As a pump, it can make the high-temperature side at a high temperature by a high-pressure heat pump effect and the low-temperature side at a low temperature by a vacuum pump effect through reversal using an external force and can be directly realized in cooling/heating, freezer/refrigerator/heating cabinet and the like without using a compressor for refrigerant and the like.

The current main-stream solar-heat power generation is a system for generating power by collecting solar light at one spot so as to generate steam at 150 degrees or more by the heat once and to generate power by using a steam turbine. An increase in size of the system is required for higher efficiency.

This is a completed technology with few technical problems but has already reached a development limit.

The technology for which an increase in size is the only means for higher efficiency cannot avoid becoming the Tower of Babel at that point of time. Maintenance of the power generation system which has been increased in size to the limit and overhaul which should be conducted after the whole system is stopped take a lot of time and labor. There is also a concern that partial disorder affects the whole and leads to destruction of the whole system.

Thus, a volume-type sterling engine known as one of engines with the best theoretical heat efficiency has attracted attention because of the recent high crude oil prices. A contract to buy a part of power supply for 40 years in the future generated by a solar heat difference power generating device using this volume-type sterling engine seems to have been already concluded in California. This engine also has a large scale, but since individual power generation systems are independent as compound eyes of a dragonfly, maintenance can be made in order for each system, and non-stop operation for 365 days is possible.

This third embodiment relates to a heat difference engine pump replacing this volume type sterling engine and is developed with the purpose of exceeding the efficiency of the volume-type reciprocating sterling engine by 5 times or more.

The basic principle of the third embodiment heat difference engine is common with the above-described second embodiment pressure/HHO implosion engine. Components added to have the sealed type heat difference engine are two jet-check-valves and high and low-temperature-conductors. With additional working, a high and low-temperature-conductors attaching portion is provided on the housing and a bypass from the low temperature side to the high temperature side, a buffer chamber, a jet-check-valve each on the low and the high temperature side, and an instant-Change-valve attaching portion are provided on the heat difference system unit or the main body.

According to this third embodiment heat difference engine, unlike the current solar heat steam power-generation system that can be installed only in a desert or wilderness, solar heat difference power-generation facilities which can be easily installed on the roof of a building or in a backyard is realized. This is a balcony-installation type solar heat difference power generating device for an apartment which is expected the most and is capable of providing electricity for air conditioning during daytime only with the size of a slightly large satellite antenna.

Moreover, since this heat difference engine is small in size and weight, it can be handled easily and a portable type which can be carried easily can be manufactured easily, too, unlike a fragile and easily breakable undependable solar panel. The capability is considered to be exerted particularly during a disaster. By using one unit as a pump by an external force to be rotated backward, the high temperature side can be kept hot, while the low temperature side can be kept cold and thus, medicines can be cooled on one side while hot water is boiled to be used for hot soup or emergency food on the other side. Moreover, unlike the solar power generation, if there is some heat source or cold source even during the night, power generation can be continued by the heat difference.

The heat difference engine such as a volume-type external combustion sealed sterling engine and the like which is probably one of the most heat efficient engines at present is considered to be an extremely promising development field. Its poor mechanical efficiency seems to prevent its spread at present. Thus, by realizing Carnot or Sterling basic theories by this third embodiment heat difference engine excellent in the heat efficiency and mechanical efficiency, highly efficient performances are expected to be generated.

The inventor has made development with the main purpose on an engine not depending on a fossil fuel from the viewpoint of how the second industrial revolution (environment/energy) can be achieved, completed an HHO implosion engine theory as a second one subsequent to the completion of the first theory of the pressure engine and succeeded in completing the third heat difference engine theory.

The 21st century type air/heat difference engine according to the third embodiment of the present invention will be described below.

The volume-type engine has a performance limitation in the rotation speed since it is of a reciprocating type. First, in order to overcome the limitation and to enable the reciprocating piston to make the isokinetic circular rotation similar to the jet engine, a doughnut-shaped cylinder is provided in the housing 1, and the output shaft unit 2 in which the pistons 4 and the like making the isokinetic circular rotation in the cylinder are provided and the rotor 7 also making the isokinetic circular rotation are provided so that a pressure boundary through complete planar contact is maintained. As a result, as the (SV/ICR/ICE type), the same rotation limitation as that of the jet engine can be achieved, and at the same time, an engine which can also overcome the super-low performance limitation which is a defect of the jet engine at a low speed is born.

In this heat difference engine, as illustrated in FIGS. 5 and 6, the energy source is a heat difference, and cold air fed into the expansion side of the doughnut-shaped cylinder is heated and expanded by the high-temperature-conductor and achieves an expansion output increasing-volume-stroke which continues to act directly on the piston 4(B) making an isokinetic circular rotation and effectively for approximately 170 degrees at a right angle to the output shaft all the time. On the contraction side of the doughnut-shaped cylinder, the air is quenched and contracted by the low-temperature-conductor, and since a contraction suction output decreasing-volume stroke similarly acts on the piston 4(A) making the isokinetic circular motion, an output stroke of approximately 4 to 8 times can be achieved at once as compared with 45 degrees in the reciprocating piston type internal combustion engine and 90 degrees in a heat engine (steam) as an expansion stroke effective both in the forward and backward paths, and performances and efficiency of at least 4 to 5 times or more experimentally known to be required for the revolution are considered to be achieved.

The details of the operation of the heat difference engine will be described later.

Moreover, unlike the speed-type jet engine, the output shaft unit 2 provided with the pistons 4 and the rotor 7 are designed so that no pressure leakage occurs and all the pressure boundaries are composed of planar contact, perfect sealing is realized so that there is no pressure leakage of a high-temperature high-pressure gas or a low-temperature low-pressure gas at all but they all work effectively for the pistons 4 and are not wasted at all. By incorporating these two moving parts and the heat difference system unit 35 to the doughnut-shaped cylinder or by directly machining and attaching them to the main body, the 21st century external combustion type heat difference engine is completed.

Since a large torque can be generated from low-speed idling falling below a MYT engine by 50% or more without assistance of the pressure engine 19, this engine is promising as the prime mover for various articles without requiring any speed change gears.

Since the effective output stroke is approximately 340 degrees in 360 degrees, it makes approximately 4 to 8 times of the current engine and how efficient it is can be understood.

This third embodiment heat difference engine with its structure can bear high-speed rotation equal to the jet engine. That means that the rotation limit of the current volume-type piston crank heat difference engine (sterling engine) is far exceeded and even reaches a level of the jet engine. Moreover, since it is of the (SV/ICR/ICE type), no cold/hot gas leaks at all and inertia moment is not cancelled at all, either.

Nowadays a household solar panel is installed to have completely electrically-powered life and all the electricity is supplied by power generated during daytime and an excess is sold while electricity is bought only during nighttime (0-energy or energy-creating) system has spread. Also use of a gas engine for power generation and hot water circulation is relatively efficient, and they compete with each other in performance, efficiency, and price. In only experimentally, a household fuel cell system also appeals its possibility as a power-generation hot-water circulation system but its amortization period is not clearly stated.

The solar panel type and the gas engine type seem to aim at halving of an amortization period from 20 years with a time-limited purchase system for 10 years.

The third embodiment solar heat difference engine of the present invention could have been amortized in 4 to 5 years. Anyhow the structure is simple the two moving parts do not require any special machining they can be manufactured at any small-sized workshops and are of resource saving type with a light weight and a smaller installation area. It seems to can become to the other party in good competition of the solar panel type or the gas engine type.

The invention according to a third embodiment invention, with the solar power, solar heat difference, progress of power generation popularization, Japan, the day when the whole world is whether you can break away from dependence on oil, I can't stop hoping that day to come as soon as possible. It is possible more than five times efficiency performance by the "Paradigm shift" (a change of idea).

This heat difference engine also relates to a principle of an engine taking over the jet engine and the reciprocating engine considered to have reached the development limit and is made to provide an engine system having efficiency/performances at least 5 times.

This third embodiment relates to a configuration and its principle of a heat difference engine subsequent to the pressure and implosion engines and taking over the volume-type reciprocating sterling engine.

The number of dedicated components of this heat difference engine is 5 components, that is, 31, 32, 35, 36, and 37 in 16 components illustrated below and 11 basic components, that is, 1, 2, 3, 4, 5, 6, 7, 8, 9, 10, and 16 are all common except for the 1/4/4, 1/6, 2/6 cycles. They are discriminated from each other by machining and incorporating the components directly in the main body or in each unit. The moving parts among them are only two. Those are, the basic output shaft unit 2, the rotor 7, and the 2 jet-check-valves. In addition to the dedicated components in this third embodiment, common modes and embodiments using a specific component such as the one requiring machining and the like will be illustrated below in a relationship with the components used in the other embodiments.

1=housing, inner peripheral wall surface circular doughnut-shaped cylinder.

The common mode is the pressure engine in the first embodiment (hereinafter referred to as the "first pressure". The same applies to the following), the second implosion, the third heat difference, the fourth implosion compression.

The mode requiring machining is the fifth general, the sixth complete combustion, and the seventh continuous complete combustion.

2=output shaft unit=output disk 3+piston 4+ring disk 5+ring gear 6.

The common mode is the first pressure, the second implosion, the third heat difference, the fourth implosion compression, and the seventh continuous complete combustion.

The fifth embodiment without ring gear is output shaft internal distal end machining gear 2:1 rotor shaft gear.

The sixth embodiment is in the output disk outlet end surface direction and the fifth embodiment is in the outer peripheral wall direction, while the others are in common.

The seventh embodiment has pistons and ring disks two each.

7=rotor, common in all the embodiments except those for the seventh embodiment has two. Small-sized twin rotor in the fifth embodiment.

8=rotor guide, common in all the embodiments except those for small-sized twin rotor, the seventh embodiment has two.

9=sync gear, both specifications are possible in all the embodiments except the fifth embodiment dedicated for five pairs of large 1 and small 4.

60=side housing, for the sixth, fifth, and W-sized thickness for the seventh embodiment and each has its own intake port. No intake port in common in the first, second, third, and fourth embodiments.

Instant-change-valve is common in all the embodiments, except the seventh embodiment continuous complete combustion (not shown).

31=low-temperature jet-check-valve, common in the third heat difference, fourth implosion compression, fifth general, and sixth complete combustion embodiments.

32=high-temperature jet-check-valve, common in the third heat difference, fourth implosion compression, fifth general, and sixth complete combustion embodiments.

36=low-temperature-conductor, common in all the embodiments except the first pressure, fifth general, and seventh continuous complete combustion.

37=high-temperature-conductor, common in all the embodiments except the first pressure, fifth general, and seventh continuous complete combustion.

35=system unit for heat difference, provided with buffer chamber 33 (each embodiment capable of individual combination and the like).

That is, as illustrated in FIGS. 5 and 6, this heat difference engine 30 includes the housing 1, the system unit 35 for heat difference forming a buffer chamber with a bypass in which the output disk 3, and the piston 4, the ring disk 5, and the ring gear 6 of the output shaft unit 2, the rotor 7, the rotor guide 8, the low/high-temperature jet-check-valves 31 and 32, the low/high-temperature-conductors 36 and 37, the instant change valve, and the side housing.

A manufacturing method of the heat difference engine of this embodiment configured by the above-described dedicated components will be described below by referring to FIGS. 5 and 6.

Regarding the housing 1, first, a shaft through port in the output shaft unit at the center and then, the inner end flat surface and the circular inner peripheral wall surface 13 are finished by a turning machine. A bypass is provided so as not to be in contact with the outer periphery of the rotor 7 and connecting the low/high-temperature side cylinder to the main body or the heat difference system unit 35, the buffer chamber 33 is provided in the middle, and the jet-check-valves 31 and 32 for preventing a backflow of a gas are provided at the inlet/outlet. The attaching portions for the low/high-temperature-conductors 36 and 37 are provided at positions of 4 to 5 o'clock and 7 to 8 o'clock on the cylinder inner peripheral wall 13 on the right and left thereof by milling.

The piston 4, the ring disk 5, and the ring gear 6 are integrated with the output disk 3 so as to form the output shaft unit 2. The inner and outer peripheral side surfaces of the piston 4, the ring disk 5, and the ring gear 6 are finished by a lathe.

The two pistons in this third embodiment are common in the 1/3, 2/3, and 2/6 cycles.

The rotor 7 is finished with its shaft portion 17 by a lathe. A piston accommodating space is finished by milling.

The low/high-temperature jet-check-valves 31 and 32 are finished by milling.

The low/high-temperature-conductors 36 and 37 are finished so as to be flush with the main body outer diameter and the cylinder surface by a lathe.

The instant-change-valve attaching portion (not shown) is provided on the main body or the system unit by milling.

In the side housing, the inner periphery, the side surface, and the end face is finished by lathe, and a through port of the rotor shaft 17 is finished at a position on the 6 o'clock side.

Next, an operation principle of the external combustion type heat difference engine according to this third embodiment will be described by referring to the drawings. FIGS. 5 and 6 (a) to (f) are sectional views illustrating an operation process of the external combustion type 2/3 cycle heat difference engine of this embodiment in time order.

FIG. 5(a) illustrates first the low-temperature compression in the buffer chamber 33 in the bypass in advance by the piston 4(B), and the gas is expanded on the high temperature side about 12 o'clock which forms an increasing-volume output stroke, while contraction has occurred on the low temperature side, and the piston 4(A) has already been subjected to the suctioning action which forms a decreasing-volume output stroke.

In FIG. 5(b), a new stroke starts by the piston 4(B) and when passing the points at 6 and a half to 7 o'clock, the high-temperature jet-check-valve 32 having sensed a pressure difference is opened, whereby jet until the pressure difference 0 is made from the buffer chamber 33 into the piston 4(B) and into the doughnut cylinder. At this time, a constant-volume movement buffer stroke is going on between the pistons 4(B) and 4(A).

In FIG. 5(c), the high-temperature high-pressure gas heated and expanded by the high-temperature-conductor 37 closes the high-temperature jet-check-valve 32 and directly acts on the piston 4(B) and at a right angle to the rotating shaft for 170 degrees and generates a large rotation torque, whereby power is directly taken out of the output shaft and is made to work. Here, the heat source of the high-temperature-conductor 37 can be thermal, solar heat and the like but is not particularly limited.

The rotating piston 4(A) preceding at the same time is suctioned by a negative pressure of a gas rapid-cooled and contracted by the low-temperature-conductor 36 from about 11:30 to about 4 o'clock and pressure-feeds a cold low-pressure gas into the bypass provided with the buffer chamber 33 from about 4 o'clock. In this bypass provided with this buffer chamber 33, the pressure of the cold gas which was fed in is raised.

Here, as a cold source of the low-temperature-conductor 36 can be snow, ice, tap water and the like but is not particularly limited.

The doughnut cylinder is divided into a hot area from about 7 o'clock to about 12 o'clock and a cold area from about 12 o'clock to 6 o'clock. This clockwise air flow is controlled by the two jet-check-valves 31 and 32.

It is possible to easily develop from the implosion engine to the heat difference engine as described above.

The merits realized by this upgrade are that the system can be installed and operated as a power generating facility anywhere as long as the sun is shining, there is no more need to convert water to a high-temperature high-pressure steam once unlike the solar heat power generation, a high-pressure boiler facility for generating steam is no longer needed, construction of a large-sized facility is not necessary, high-pressure piping facilities are not necessary, a high-pressure steam management system is not necessary, and other various related devices are not necessary, whereby resources can be saved. A small-sized light collecting mirror, a power transmission/distribution facilities and the like are common required equipment.

Well, the current situation is seeking high output, pushing for large-sized solar thermal steam power, the necessity itself is considered to be lost by emergence of the 2/3 cycle heat difference engine of this embodiment. This is because output will be increased by increasing the rotational speed, increases almost directly proportional to the engine speed, this seem rotation is equal to that of the jet engine limit.

Anyhow, the low-speed torque is mighty, so high-speed rotation is not required usually. All of margin all can keep it as a spare for the emergency.

The solar heat steam power generation or particularly the nuclear steam power generation uses only high-temperature heat and discards not able to utilize heat to the air or sea and rivers at about 70%. The change of the sea temperature particularly around the nuclear power plant to a tropical zone has posed a large environmental problem. On the other hand, the heat difference engine is a highly efficient engine which can recover sufficient power generation energy from the waste heat and is environmental friendly.

The heat difference engine also uses low-temperature snow, ice, etc., as an energy source and discards those not too hot or not too cold but neutral and environmental friendly. Thus, unlike a large-sized facility installed on a coast line but a medium to small sized facility can be installed on an inland having much snow, which means local production and local consumption, and people can live without a risk adjacent to the facility without a need of high-voltage power transmission lines.

Cold snow and ice will be also able to be utilized as an energy resource.

The medium speed type heat difference engine's idling-speed 30 rpm is, less than ½₀th of (600~800 rpm current high-speed general engine), it seems to enough for medium speed type for current engine's idling-speed. And 2 times of rotation for high-speed type. Excellent performance and fuel consumption, for vessels currently, many are active, the maximum speed of high-speed diesel engine long stroke for high speed diesel locomotive is in place it also just 1600 rpm.

Currently the best fuel economy performance, very large low-speed diesel engine, has about 1 m diameter of the piston bigger than drum can, it is vertical reciprocating extent 2~4 m 100 times every minute scene is tremendous. Impact noise, vibration, waste heat, and so on . . . , it is the durability of 20-30 years.

In contrast, the isokinetic circular rotating heat difference engine makes a circular rotation in one direction with an equal piston larger than a drum can from idling at 10 rotations/minute or less and generates little impact or vibration or small heat generation. Thus, reflected durability of 5 to 10 times or more seems to be possible.

For reference, the size of the marine diesel engine 100 000 horsepower or more is length 25 m, height 15 m, Width 5 m, weight 2500 tons, and 25,000 liter about exhaust.

With the 2/3 stroke heat difference isokinetic circular rotating engine, a space having the whole length, height, width, and the each 5 m seems to be sufficient.

Life of the large vessels, such as it is being produced as planned in about 20 to 30 years now. Because it cannot transshipment, big engine, the life of the engine is like has become the life of the ship immediately.

The small-sized, light-weighted, and simplified heat difference engine of this embodiment seems to have durability for 100 to 150 years. Because completely non-contact design if it can be will have a more excellent durable be think. Such long durability to make a variety of things, we will become the starting point to encourage a fundamental paradigm shift for the future.

On the water, water cooling is easier and more convenient than on the land. Furthermore, it is extremely advantageous for an engine for an airline flying at a high altitude. The altitude of 10,000 m is the world of an external temperature of −50° C. Where quality and quantity of energy are better than those of snow and its effective use should be examined.

If this external combustion type heat difference engine is used instead of the current jet engine which is spreading high-temperature harmful exhaust as it is, how friendly it good would be to the environment. The temperatures difference in the space (universe) is said to be approximately 150° C. and −150° C. on the sun shining or the shade side, respectively. This heat difference of 300° C. is a tremendous energy resource for the external combustion type heat difference engine. It might be a more reliable power source/power generation system in the space than a delicate solar panel.

The external combustion type heat difference engine of this third embodiment is the dream engine which can exchange inexhaustible solar light and heat, ground heat, snow, ice, and waste heat discarded in a factory as non-reusable to the power source. As a result, it is no longer necessary to change the heat energy once to steam at 150° C. or more as to obtain power.

Unprecedented area from here now, becomes edition car for the 21$^{st}$ Century of the Sterling engine, it is an external combustion type air heat difference system, with potential enough to be able to propose a new direction to the development of eco-friendly vehicles are deployed fierce competition in recent years.

Of course the type of a heat source does not matter naturally perfect pollution-free vehicle can be realized by using solar heat or by combusting hydrogen.

(T.I. Correction)

When competition in research and development of automotive reciprocating Sterling engine in the world is past, there is a history that has been developed from the poor to give up and start-up accelerator response and the lack of output.

However, the air heat difference engine of this embodiment is capable of instant operation by an air pressure and has an immeasurable possibility of power-up by approximately 5 times from small-sized and light-weighted characteristics.

In the case of an automobile on which the air heat difference engine of this third embodiment is mounted, the air pressure can be used as it is for a short distance, while in the case of a long distance, instead of waiting for the high pressure air tank to be exhausted, the engine can be shielded and used as an external combustion type air heat difference engine. By expanding air to the high-temperature high-pressure air by using anything as a heat source instead of gasoline and cooling it by air or water, the engine can be instantly changed to an air heat difference engine as it is. By mounting this engine requiring no ignition device or the like, the current air car could improve the performances by 3 to 4 times.

Pressure air engine car runs under pressure air at 95% and the rest for emergency and a possibility of steam running.

The external combustion type air heat difference engine car runs under pressure air at 20% and the rest with a possibility of long-distance running with the heat difference engine. It is needless to say that the external combustion type air heat difference engine also has a mechanism of pressure air engine but an independent twin hybrid of the pressure air and heat difference engine is upgraded and can naturally present more merits.

A first step to the environmental/energy revolution is first, the pressure engine, then, the implosion engine, and this external combustion type air heat difference engine. The engine of this embodiment, instantly converts to pressure air engine or an air heat difference engine, only by one valve operation, particularly for start an automobile is instantly. In the long traffic jams and long downhill slope, by change to the pressure air engine, it is more economical. Air can be filled by using this period. This is an air hybrid regenerative system.

The inventor himself believes that large trucks and buses, cargo and passenger trains, cargo and passenger ships, air cargo and passenger aircrafts, that move long distances, will be a great demand for larger and more economic effects much more than eco cars. The isokinetic circular rotation type internal combustion engine, of the implosion compression, complete combustion, and continuous complete combustion are as will be described later.

These are all speed volume type and engines provided both with favorable performances of the speed type and the volume type and has capability to realize easily with a smaller cost, the performances more than the volume type at low speed, and the performances of high speed area is almost same at speed type. This is exactly the 21st century internal combustion type rocket and jet engine.

The most active other engines right now from the 20th century are the engine of volume type straight-through. 2, 3, 4, 5, 6, 7, 8, 9, 10, 11, 12, 16 cylinders, independent single-cylinder reciprocating engine, serial, parallel, horizontal-opposed, V type, W type, all of those are straight volume type.

(The 21st century type of them has been already invented)

However, the 21st type of this volume-type air-cooling radial reciprocating engine has won the invention grand prize in a design contest for creating the future in the 21st century in 2006. This air-cooling radial engine was also mainly employed for engines in bombers, Grumman fighter, the type Zero fighter 'Zero' and the type One fighter 'Oscar' Japan is proud of and other fighters during the World War II. On the other hand, the straight type is a liquid-cooling engine mainly for fighters employed in the Spitfire, Messerschmitt, Mustang, type Three fighter 'Hien' and the like. And this straight type has made great development on land, sea and air. The reason is that it is simple, inexpensive, compact, easy to be manufactured and handled, and convenient, and that points are also largely taken over by the engine of the present invention.

Since this third embodiment is a basic principle, many applications are expected. Reduction of fuel consumption is $CO_2$ reduction in other words, and development of a fuel-cost improvement technology is a matter of fact, but reduction of $CO_2$ generated in the manufacturing process is also an important factor. The engines of third embodiment that can be manufactured by about a dozen of parts are promising in that sense, too.

This third embodiment is a 21st century engine succeeding the volume type straight reciprocating sterling engine, and its further size reduction and simplification can be made only by incorporation of sync gears inside a power disk, and weight reduction by omitting a large ring gear, and the sync gears which have been already designed.

The 21st century (SV/ICR/ICE type) external combustion type air heat difference engine, those indispensable conditions are;

First, it should operate only by isokinetic circular rotation;
Second, complete compression should be ensured;
Third last, increasing/decreasing, pressure should directly act on the output shaft at a right angle.

The above three points are indispensable conditions.

In the air heat difference engine of this embodiment, a rotation moment is not wasted, at all but also fully changed to a rotary motion force effectively, and a strong torque is generated from a low speed for work. Also, the torque/output increase substantially in proportion to the size of the engine volume, development in fine classification is easy.

According to this third embodiment, a (SV/ICR/ICE type) external combustion type air heat difference engine pump is offered, that realized the heat expansion/heat contraction engine theory of Carnot and Sterling only through the isokinetic circular rotary motion using high temperatures of solar heat, ground heat, waste heat from power plants, factories engines and the like, Low temperatures of snow, ice and the like, Heat differences such as the temperature difference between, the surface and the underground of a desert, Deep sea water and surface sea water and the like, as power sources heat difference of, Directly taking out a rotation force from the temperature difference=heat difference and taking over the reciprocating sterling engine.

Currently, a variety of artificial waste heat that thought to non-reusable waste is discarded.

This is a heat difference engine power generation system that generates power efficiently by using artificial heat, from various factories, excess heat, from nuclear steam power plants, waste heat from diesel power plants or exhaust heat from ship engines, and natural solar heat, ground heat, or snow, ice and the like and it is intended to take advantage of the characteristics of small size, low rotation and high torque, can be easily introduced into a small sized business.

Especially, at nuclear steam power plants, 70% of the calorific value is going discarding, Be recovered by the heat difference engine, That the recovery is possible, as the percentage of more than the original 30% efficiency I even think.

Moreover, this engine can be applied to an ecological air heat difference engine car because of its favorable efficiency.

The application to the air heat difference engine car makes petroleum unnecessary by combining free use of solar heat with an air heat difference engine and a pressure engine and by installing a free air station where free air is compressed on main roads. Unlike gasoline or hydrogen, there is no risk of explosion, and the station can be completely unmanned, which requires no running cost and can be realized as a public power source only in Japan with a sense of public duty. If Japan shows an example, there would be many followers. It would be wonderful if Japan can lead the world in that way.

For household use, by combining a reflection mirror having a diameter of approximately 1.2 m and the external combustion type air heat difference engine, a free energy system using the solar heat is completed. Since particularly further size reduction can be expected, if air conditioners are operated with the solar heat difference power generation for apartment houses, power that can cover a space for 12 Tatami matt ($19.83\ m^2$)=($213.4\ ft^2$) can be supplied with 65% efficiency, whereby power shortage during daytime can be solved and electricity charges can be largely saved.

The external combustion type air heat difference engine of this embodiment reviews the sun, air and water which are origins of substances from a new point of view and explores a way to utilize them.

[Fourth Embodiment]

The present invention also provides a (SV/ICR/ICE type) rocket combustion type sealed HHO low-pressure continuous injection explosion/vacuum buffer/suction injection compression, implosion compression rocket engine as a fourth embodiment.

This engine was added as an extended cruising distance system of the second embodiment and has a light load-constant speed, which is effective in eco-driving and can save a gas in a high-pressure compressed gas tank so that the high-pressure gas can be used only when it is really needed.

This fourth embodiment relates to a (SV/ICR/ICE type) rocket combustion type sealed, 2/3 stroke implosion compression rocket engine pump using a hydrogen and oxygen gas (HHO) obtained by electrolyzing water as a fuel and having a 2/3 cycle as an output stroke of (1) increasing-volume output stroke repeating rocket combustion type HHO low-pressure continuous jet/ignition explosion (combustion)/vacuum contraction (suction jet), (2) vacuum buffer movement constant-volume stroke, and (3) piston vacuum suction output decreasing-volume stroke/low-pressure fuel injection/compression stroke operating, so that efficiency of a hydrogen fuel cell is 3 times, and surpass 5 times or more performances and efficiency is to allow.

Here in case uses a single tank;

And on the assumption of two cases with while being electrolysis will be described.

By putting a predetermined amount of water in an oxygen and hydrogen mixed high-pressure tank and electrolysis it by using an electrode inside, a high-pressure mixed gas (HHO) of oxygen/hydrogen collects therein. By injecting and igniting it into a cylinder combustion chamber in the internal combustion engine type implosion compression engine of this fourth embodiment, an expansion output increasing-volume stroke with continuous implosion starts in which a high pressure generated by strong explosion/combustion pushes and moves a piston. Soon as the subsequent piston enters the combustion chamber, the fuel supply is stopped, and when the expansion stroke ends subsequently, the combustion gas sandwiched by the both pistons that gas is back to a water droplet and vacuumed, and a buffer movement constant-volume stroke starts. In the preceding piston, the implosion compression 3 cycles, that is, a vacuum suction output decreasing-volume stroke/low-pressure fuel injection/compression decreasing-volume stroke are completed during a period from about 12 o'clock to about 6 o'clock, which is a cold side on the opposite side. Each output stroke is ensured approximately 170 degrees, and 340 degrees in 360 degrees become an effective output stroke at the maximum (when there is no compression). The details will be described later (See FIGS. 7 and 8).

Or, by returning the accelerator to a half or less, driving is proceeded with by a gas collected by electrolysis of water by using a generator/battery, but since the gas pressure is low at that time, a compression stroke of the HHO gas for idling is required at the minimum. The (HHO) gas is supplied from a low-pressure nozzle into a cylinder and a piston during the suction stroke which turned to a negative pressure in the decreasing-volume output stroke. The compressed (HHO) gas passes through the bypass and stands by in the buffer chamber, and changes to a negative pressure in order to go to the main combustion chamber cylinder as soon as the piston enters the main combustion chamber, and thus, the gas pushes open the jet-check-valve from the buffer chamber and is ignited at the same time when it is jet into the piston and the cylinder. It seems to be sufficient for idling and low to medium-speed rotation regions. However, if extra power is needed for start acceleration, passing or driving on a tight uphill slope, the system enhances the power by high-pressure injection in a supercharging manner as a premise.

Of course, since the system is not a permanent engine, the cruising distance is varied depending on the capacity of the high-pressure/low-pressure tank and the capacity of the generator/battery. However, the tank size and the like can be selected in accordance with the purpose.

The HHO implosion compression engine of this fourth embodiment is an engine system provided with a portable electrolysis function for water, which is basically sealed type but can be also used in an open style. Since handling of hydrogen requires specialized knowledge and qualification and involves risk, a general public cannot handle it all by themselves, but the sealed type implosion compression engine system of this fourth embodiment is of a self-production self-consumption type, there is no need of hydrogen filling or the like which might be dangerous in case of leakage, and can be an effective solution to spread utilization of a hydrogen fuel to the general public with an ease in handling equal to that of PHV and EV.

This implosion compression engine is closely related to the heat difference engine. The heat difference engine obtains a rotation force when the piston is pushed and pulled by the gas heated and expanded or cooled and contracted. On the other hand, this implosion compression engine is considered to be stronger since its rotation force is obtained by expansion of a gas caused by explosive combustion and a suction force generated by subsequent condensation to droplets of the combustion gas forming vacuum. This vacuum suction force is considerably strong and has a possibility of latent and jet-efficiency/performances that cannot be estimated only by heat efficiency.

The rocket combustion type implosion compression engine of this fourth embodiment relates to a configuration/principle of a completely non-pollution engine using a mixed gas (HHO) of hydrogen/oxygen as a fuel in place of the fuel cell which is said to be the most innovative at present and is composed in order to provide an engine system having efficiency performances at least 5 times.

The framework system theory relates to a configuration/principle of a completely non-pollution (SV/ICR/ICE type) rocket combustion type sealed implosion compression engine using hydrogen as a fuel similarly to a fuel cell, having some merits of the jet engine, reciprocating engine, rotary engine, steam engine, and electric motor and competing against a fuel cell.

This HHO implosion compression engine can be also manufactured by using basic lathe and milling.

Each of these components has a sectional shape of an inevitable circle and those including that and the rest can be freely designed.

The number of dedicated components in this fourth embodiment is the following 15 including those for the implosion engine and the heat difference engine and the moving parts among them are basically the output shaft unit 2 and the rotor 7 in addition to the two jet-check-valves.

1=housing, inner peripheral wall surface circular doughnut-shaped cylinder.

2=output shaft unit, output disk 3+piston 4+ring disk 5+ring gear 6.

7=rotor

8=rotor guide

9=sync gear,

Side housing (not shown),

Instant-change-valve (not shown)

21=high-pressure injection nozzle

22=glow ignition plug

31=low-temperature jet-check-valve

32=high-temperature jet-check-valve

36=low-temperature-conductor

37=high-temperature-conductor

41=low-pressure injection nozzle

45=system unit for implosion compression

Figure 7:
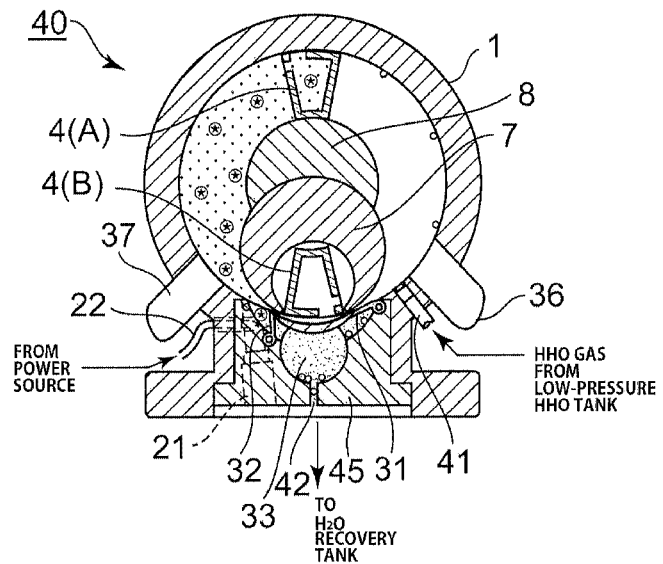
FIG. 7 and FIG. 8 are the sectional view illustrating a part of the operation stroke of an implosion compression engine of a fourth embodiment according to the present invention.
Figure 7:
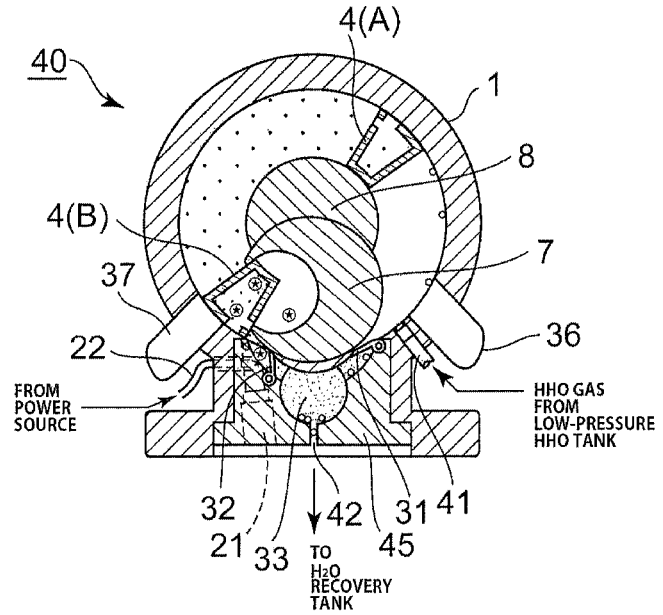
Figure 8:
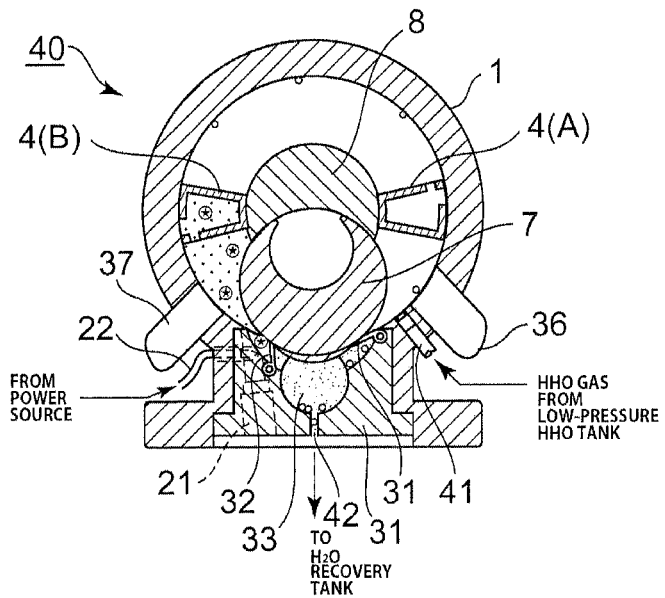
Figure 8:
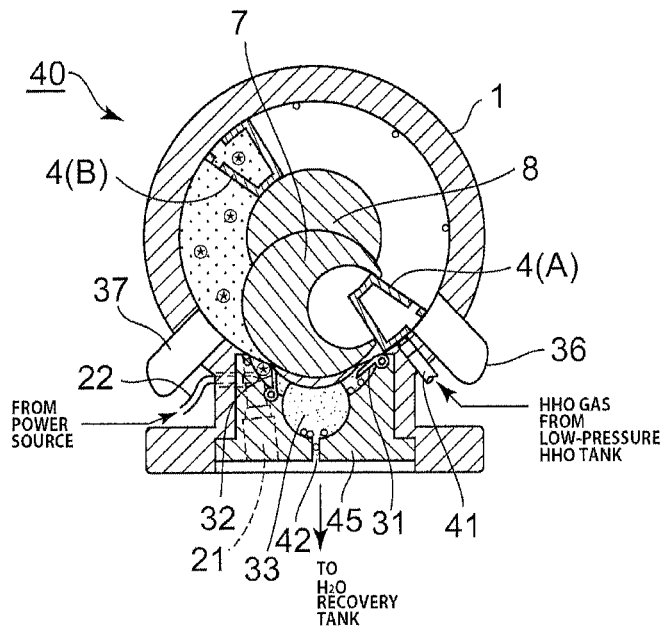

That is, as illustrated in FIGS. 7 and 8, a rocket combustion type HHO implosion compression engine 40 of this fourth embodiment includes the housing, inner peripheral surface circular doughnut-shaped cylinder 1, and the output disk 3, the piston 4, the ring disk 5, and the ring gear 6, integrating the output shaft unit 2, and a system unit 45 provided with the rotor 7, the rotor guide 8, the sync gear 9, the low-temperature jet-check-valve 31 and the high-temperature jet-check-valve 32 for implosion compression, the instant-change-valve, a high-pressure injection nozzle 21, a low-pressure injection nozzle 41, a glow ignition plug 22 and the like, and the side housing. The common members with the engine structures in the first, second, and third embodiments are also applied in the description to the engine of the fourth embodiment.

The implosion compression engine 40 of this fourth embodiment has the configuration similar to the above-described basic configuration and the third embodiment and is newly provided with the high-pressure injection nozzle 21 for injecting the HHO gas and the glow ignition plug 22 in an operation space of the high-temperature jet-check-valve 32 and the low-pressure injection nozzle 41 adjacent to the low-temperature jet-check-valve 31 for injection into the low-temperature side cylinder, piston, and rotor in the heat difference system unit 35 or the main body. Alternatively, they may be provided inside the system unit 45 for implosion compression.

An $H_2O$ recovery pipe 42 is provided from the bypass buffer chamber 33 to the outside. This is a (SV/ICR/ICE type), rocket combustion type sealed 2/3 cycle implosion compression rocket engine pump characterized by providing driving means including a stroke giving a rotation operation to the piston 4 by HHO gas injection of a high-pressure injection nozzle 21, ignition combustion in the glow ignition plug 22, injection of the HHO gas into the cylinder by the low-pressure injection nozzle 41, pressure difference and temperature difference by compression in the bypass and into the buffer chamber 33, and opening/closing control of the low-temperature/high-temperature jet-check-valves 31 and 32.

As a self-powered pump, it rotates forward only when the high pressure gas is used and becomes the same as the second embodiment and generates the effect similar to that of the third embodiment by reversing the rotation by an external force.

A manufacturing method of this HHO implosion compression engine will be described below by referring to FIGS. 7 and 8.

Regarding the housing 1, first, an inner end flat surface, a circular inner peripheral surface, and a through port for the output shaft disk 2 at the center are finished by lathe. A bypass from the low-temperature side cylinder to the high-temperature side cylinder and the buffer chamber 33 are provided in the implosion compression system unit 45 without being in contact with the outer peripheral surface of the rotor 7, the combustion-side high-temperature jet-check-valve 32, and in its operation space, attaching ports of the high-pressure injection nozzle 21 and the glow ignition plug 22 are provided, and the compression-side low-temperature jet-check-valve 31 is provided in the system unit 45 (may be provided outside), in which an attaching port of the low-pressure injection nozzle 41 is machined by drilling and tapping. The $H_2O$ discharge recovering pipeline 42 is provided by drilling from the buffer chamber 33 in the middle of the bypass. By incorporating the implosion compression system unit 45 machined and configured as above in the system unit installation portion of the housing 1, an internal combustion engine type rocket combustion HHO implosion compression engine is completed.

Subsequently, the operation principle of the (SV/ICR/ICE type), rocket combustion type sealed HHO implosion compression engine according to this fourth embodiment will be described by referring to the drawings.

FIGS. 7 and 8(a) to (d) are sectional views illustrating an operation stroke of the HHO implosion compression engine of this fourth embodiment in a time order.

(T.I. Correction)

First, the gas (HHO) compressed at a low temperature in the buffer chamber 33 in the middle of the bypass by the piston 4(B) beforehand, and when the piston 4(B) passes about the points of 6:30 to 7 o'clock, by the high-temperature jet-check-valve 32 which detected the pressure difference is opens and squirt into the piston and the doughnut cylinder till the pressure difference 0, and the high-temperature jet-check-valve 32 is closed, and the (cold-temperature medium-pressure) gas ignited by the glow ignition plug 22 and combusted in an explosive manner that high-temperature, high-pressure gas works directly to the piston 4(B) in a direction at a right angle to the rotation shaft all the time over 170 degrees and generates a large rotation torque, which forms an increasing-volume output stroke, and power is taken out from the output shaft and made to work.

At this time, if the rotating piston 4(B) cannot exceed 12 o'clock by one implosion action, the (HHO) gas is automatically added and supplied, the implosion is repeated twice or three times until being vacuumed beyond 12 o'clock as an output stroke, and then, the rotating piston 4(B) is subjected to the suction output action.

By using this suction action, the (HHO) gas is supplied from the low-pressure nozzle 41, and the same stroke is repeated. If there is an allowance in the high-pressure tank, the (HHO) gas is injected by the high-pressure nozzle 21 when the piston enters the cylinder combustion chamber and is ignited by the glow ignition plug 22 so that a stronger output is obtained. At this time, the low-pressure side is cut off.

By electrolyzing water at a low to medium speed and by injecting a high-pressure (HHO) gas in start and acceleration, ascending slope, and passing on a highway, performance improvement equal to a current engine with a turbocharger or with a supercharger can be expected.

This engine is originally a pressure engine and is completed by being added with the systems of an implosion engine, a heat difference engine, and an implosion compression engine. A single specification is also naturally possible.

The (SV/ICR/ICE type), rocket combustion type sealed HHO implosion compression engine of this embodiment can be incorporated in a single engine main body together with the original pressure engine, the implosion engine, and the heat difference engine and this is an engine system capable of selecting the most suitable cycle according to use conditions and using it singularly or by combining them. Particularly, the implosion compression engine is considered to be an unprecedented combustion theory form.

According to this fourth embodiment, an engine system can be provided in which water is electrolyzed by electricity generated by the above-described pressure engine, the heat difference engine and the like, an obtained hydrogen/oxygen gas (HHO) is stored in the high-pressure tank, and in addition to, the functions (low-pressure injection/compression, ignition explosion increasing-volume output/contraction injection, vacuum buffer constant-volume movement, suction output) of this implosion compression engine, an output is further improved by a high-pressure injection ignition, and further effectiveness in mobile use regardless of time and place can be exerted.

[Fifth Embodiment]

A fifth embodiment of the present invention provides a (SV/ICR/ICE type), jet combustion 4-cycle engine pump. In this fifth embodiment, it is explicitly stated that even a 4-cycle general engine can be reborn as a (SV/ICR/ICE type), jet combustion 4-cycle engine.

The fifth embodiment is composed of the following components (the entirety is not shown). Those other than the structure specific to this fifth embodiment are basically the same as those in the above-described embodiments.

(1) Cylinder housing for 1/4/4 cycle general engine, for 2-rotors (2) Output disk inner peripheral wall surface outlet type, from the assembled rotor, then ring disk after-mounted (3) Small-sized piston for 4 cycle, piston 64(A)/64(B) for complete combustion, (FIGS. 10 to 12; references sixth embodiment) same type inner diameter large-sized (4) System unit for 4-cycle (5) Bypass sub combustion chamber (6) Two small-sized rotors (7) Rotor guide for 2 small-sized rotors (8) Side housing for 2 rotors The general 4-cycle engine of this fifth embodiment has the above-described basic configuration and it is reasonable to select two rotors in view of the performance.

In order to have two rotors, the rotor diameter is made into a half of a cylinder diameter, and each center is moved to the outside so as to ensure planar contact. The cylinder wall is cut off for that portion, which becomes a notch portion.

By the portion by which the rotor center part is shifted to the outside, the inner diameter of the doughnut cylinder increases, and the piston size is reduced.

By accommodating a small-sized sync gear set inside the output disk, the large-sized ring gear 6 and the sync gear 9 are no longer necessary. The second rotor provided at the position of 12 o'clock is in charge of exhaust and intake, the combustion gas is discharged from an outlet whose direction is changed to the output disk outer peripheral surface and passes through an exhaust duct provided in the cylinder wall and is exhausted from an exhaust port provided at a position of about 11 o'clock. The intake air enters the cylinder from the inlet of the ring disk through an intake port and an intake duct provided at about 2 o'clock of the side housing and has the similar stroke in a unit similar to the 1/6 cycle.

This embodiment is a (SV/ICR/ICE type), jet combustion open type 1/4/4 cycle jet engine pump characterized by providing driving means including a stroke giving a rotation operation to the piston as above.

Though the number of components and work processes are increased, the exhaust volume is halved, and the performance/efficiency is lower than the 1/6 cycle, it seems to have a great significance in terms of hobby-oriented values as enjoying its unique exhaust sound and design of an intake/exhaust system as well as reborn of the 4-cycle system having been active in the 20th century to be handed over in the future. Yet, the efficiency/performance of 2 to 3 times of the current 4-cycle should be exerted but it seems slightly short of performance for promotion of the environmental energy revolution. It becomes equal with a single-piston type and is advantageous as a low-pollution measure due to a super-long stroke. Moreover, this 4-stroke type can be extended to the pressure, implosion, heat difference, implosion compression, and continuous complete combustion engines.

It can be also established as a pump similarly to the first to fifth embodiments but it is still a 4-cycle.

This fifth embodiment seems to be inferior in the performance to all the other embodiments of the present invention but it still has performance efficiency of 2 to 3 times of the current 4-cycle. However, it is not sufficient to accomplish the revolution with 2 to 3 times.

Unfortunately, this embodiment can help accomplish the environmental energy revolution in the future but cannot play an important role in it. However, it seems to have significance and a value in handing over the basic 4-cycle engine in the future, it is hoped that this engine is loved by fans for a long time like Harley fans as 1/4, 1/4/4 cycle engine born again as a (SV/ICR/ICE type), jet combustion type jet engine.

[Sixth Embodiment]

The present invention further provides a (SV/ICR/ICE type), jet combustion type multiple fuel complete combustion, 1/6 cycle [(1) intake, (2) {complete gasification}, (3) compression*(4) combustion, (5) {complete combustion=detoxifying}, (6) exhaust] 6-stroke complete combustion jet engine as a sixth embodiment.

The (SV/ICR/ICE type), jet combustion type multiple fuel complete combustion, 1/6 cycle jet engine of this sixth embodiment is a complete combustion jet engine which takes place of a speed-type jet engine and a volume-type 2&4 cycle internal combustion engine straight type which have achieved the most remarkable development in the 20th century and is reborn while the characteristics of the both engines are maintained, and this is the 21st century (SV/ICR/ICE type) multiple fuel complete combustion jet engine.

The currently main-stream engines are roughly divided into two streams, that is, a (speed-type) jet engine (mainly for aircraft) and a (volume-type) reciprocating straight type engine (for other uses including land, sea, and air), and there is also a surviving of an air-cooling radial reciprocating engine, few rotary type, and a rocket engine as a special class.

The engine which has already finished the development stage and is currently manufactured only for miniature models is the air-cooling radial reciprocating engine. However, its 21st century type has been already reborn and emerged as a (MYT) engine in 2006 and won the invention grand prize in a design contest for creating the future of the 21st century.

It is reported that various test data using a prototype has been collected and the engine has succeeded in rebirth as a (MYT engine).

Since it is difficult to manufacture super-large sized or super-small sized ones, production will be started with a small to medium-sized high output practical machine. From this will be associative us of appearance of the 21st century type straight-type and speed-type jet engine, it is the event that is thought to be inevitable, and inevitably anymore.

The sixth embodiment is basically a (SV/ICR/ICE type) and provides a 21st century type isokinetic circular rotation internal combustion engine type multiple fuel complete combustion jet engine having a shaft output performance characteristic of a speed-type jet engine in a high-speed area and far exceeding the performance of the volume-type at a low speed.

It is needless to say that these engines are currently the most widely spread and used in any applications on land, sea and air including a miniature model with displacement of 0.1 cc or less to those for large-sized ships having 250 million cc or more and 100 thousand horsepower or more and is exactly the 21st century type which can work as the both. Of course it is needless to say that the merits of the single-cylinder independent type can be also extended to any applications.

The MYT engine is also extremely valuable for the inventor as a 21st century type volume-type or air-cooling radial engine. That is because the engine takes the initiative in the coming century and if the straight type and the speed type will be reborn as the 21st century type, great expectation and emotion close to confidence are coming up.

The MYT engine in a super-small or super-large size is considered to be uneconomical in manufacturing a practical machine in terms of durability and economy but it seems to be able to work in large-sized trucks and buses, boats, yachts, small to medium-sized aircrafts and the like.

On the other hand, the engine of this sixth embodiment has only two dedicated moving parts and the structure has changed to a further simple (SV/ICR/ICE type), and there is no movement other than the isokinetic circular rotation similar to the jet engine except the jet-check-valves.

This multiple fuel complete combustion engine was developed by detuning (high speed suppress) the current jet engine in order to realize efficiency/performance 5 times or more of the current reciprocating engine and naturally has a structure that can bear high rotation equal to that of the jet engine. It should be rather referred to as the 21st century type speed-type jet engine in the current classification.

This multiple fuel complete combustion jet engine is made capable of performance/efficiency 5 times or more of the current reciprocating engine by the paradigm shift.

These engines not requiring any particular type of fuel or energy source as the 21st century multiple fuel complete combustion jet engine are capable of expansion in all the directions.

The reciprocating engine (volume type) now in the main stream has exceeded its performance limit by the jet engine and the gas turbine engine (speed type) but their roared, high-temperature exhaust, super-high speed rotation high output, enormous fuel consumption and the like are as known and cannot be mounted on an automobile as it is. Low fuel consumption/resource saving is a request by all the mankind, and Revolutionary innovation is indispensable. However, the basic principle of the currently main-stream reciprocating engine or jet engine has already exceeded the limit point in any sense (personal opinion of the inventor) and cannot last till 2020 even with whatever improvement or partial innovation.

All the internal combustion engines used throughout the world at present are composed of four cycles (intake/compression/combustion/exhaust) including the jet engine. It was considered to be ideal 130 years ago but even several years after that, necessity to provide an evaporating device in a stage prior to the intake was noticed (that is, evaporation stroke). Today, various catalysts need to be provided in order to handle further inconvenience (that is, post-treatment stroke of toxic exhaust). This can be expressed in order as evaporation, intake, compression, combustion, exhaust, and post-treatment. However, the jet engine is not capable of post-treatment.

That is, it becomes apparent that the request in the 21st century cannot be met by the 4-cycle system without 2 cycles of (complete combustion=detoxifying) and (evaporation=complete gasification).

However, a new engine has not been generated yet by arranging these 6 cycles in an ideal manner.

Therefore, the (SV/ICR/ICE type) jet combustion multiple fuel complete combustion jet engine of this sixth embodiment is provided.

This is also configured basically as a super-strong torque oriented (volume type) of super long stroke diesel engine for a super-large sized ship, that the most excellent in heat efficiency/fuel cost performance, And a super-strong horse-power oriented (speed type) jet engine, for an aircraft the most excellent in weight performance, That is overcome their limits, and can achieve 5 times or more or 10 times of the current reciprocating engine.

Such as comparable to the industrial revolution, the environment and energy as the driving force of the revolution, it is an invention that is configured with an emphasis on whether or not to withstand its responsibility.

Regarding the complete combustion engine of this sixth embodiment, as illustrated in FIG. 1, a doughnut-shaped cylinder is provided in the housing 1, in order to realize the isokinetic circular rotation equal to the jet engine, and by providing the output shaft unit 2, in which the output disk 3, the piston 4, the ring disk 5, and the ring gear 6, making the isokinetic circular rotation in the cylinder and the rotor 7, which also makes the isokinetic circular rotation so that the pressure boundary is kept by complete planar contact, the speed volume type is obtained, and the rotation limit equal to that of the jet engine can be achieved in a high speed area, while even the low-speed extremely low performance limit which is the largest defect of the jet engine can be overcome in a low speed area. The engine with which high performance far beyond that of the volume-type reciprocating engine can be exerted both at a low speed and a high speed, less fuel-cost and low pollution are realized, and any fuel can be utilized as an energy source can be obtained.

Though the complete combustion engine of this sixth embodiment has the configuration similar to the above-described basic configuration and the third embodiment, the housing 1, the output disk 3, the ring disk 5, and the piston 4 need some machining. A sub combustion chamber S of the main body or the system unit is given screw hole machining for attaching the high-pressure fuel injection nozzle and the glow ignition plug for normal use, and a lock valve for automatic opening/closing of the combustion gas jet-check-valve is provided in an operation space of the combustion gas jet-check-valve.

Moreover, these pistons are made to do the division of roles, the outlet is provided in the preceding side output disk of the first piston, and the inlet is provided on a following side of the ring disk joined to the other end so that, they are in charge of exhaust and intake, respectively. The second piston is in charge of compression on the preceding side, and combustion on the following side, and the spaces of the first and second pistons are in charge of a complete gasification stroke, and the spaces of the second and first pistons are in charge of a complete combustion=detoxifying stroke. In the second piston, a combustion gas passage tunnel is provided from the outer peripheral surface to the rear surface. This embodiment is a (SV/ICR/ICE type) jet combustion open type 1/6 cycle multiple fuel complete combustion jet engine pump. Characterized by providing include driving stroke means for giving a rotation operation to the piston; (1) An intake stroke for sucking air into the cylinder through the inlet in the ring disk on the following side of the first piston from the intake port of this side housing; (2) A complete gasifying stroke performed for a mixture after direct fuel injection in the cylinder in a space sandwiched between the first and second pistons; (3) A compression stroke in which a part is compressed in the rotor and in the second piston and all others in the sub combustion chamber in the bypass and ignited; (4) A main combustion stroke, in that the combustion, gas is directly and partially stormed the rotor from a Ejection hole of sub combustion chamber; The gas in the rotor is, also subjected to secondary combustion, and is made to act to push out the second piston out of the rotor and at the same time it is made to pass through the tunnel the jet hole in the second piston, the combustion gas is jet so as to open the automatic opening/closing lock valve, and the combustion jet-check-valve is instantly opened and combusted in the cylinder; (5) A complete combustion=detoxifying (including silencing, impact wave cancellation and the like) performed in a manner sandwiched between the second and first pistons; (6) An exhaust stroke of exhaust from the housing exhaust port through the exhaust duct provided on the housing end surface from the outlet of the preceding-side output disk of the first piston;

Including the above, give rotation working, to the piston that the drive means is provided including a 3 stroke characterized (SV/ICR/ICE type) jet engine, 1/6 cycle multi-fuel type complete combustion type open type jet engine pump.

As a pump, the effect similar to that of the first embodiment is exerted by forward rotation, by an external force, and the same as third embodiment by backward rotation.

The complete combustion jet engine of this sixth embodiment can be manufactured by means of a basic lathe and milling. The number of dedicated components are the following 10 components, and the moving parts among them are basic two components, the output shaft unit 2 and the rotor 7, two jet-check-valves (31, 32), and one lock valve (66) (See FIG. 1 and FIGS. 10 to 12).

1=dedicated housing, inner peripheral circular doughnut-shaped cylinder (milling of exhaust port and exhaust duct)
[1/6 cycle complete combustion engine and cylinder housing 61]

2=output shaft unit, milling outlet for output disk 3, tunneling in one side piston second (64B), milling inlet in the ring disk 5 are required.

[For output shaft unit complete combustion, For complete combustion output disk Housing exhaust port end face Model, Intake port is in the ring disk.]

7=rotor
8=rotor guide
Instant change valve (not shown)
60=dedicated side housing (See FIG. 1, machining of intake port and intake duct)
31=compression side (low temperature) jet-check-valve
32=combustion side (high temperature) jet-check-valve
66=automatic opening/closing lock valve
65=system unit for complete combustion That is, the complete combustion engine of this embodiment, the housing 1 (61), the output shaft unit 2, integrating the output disk 3, the piston 4, the ring disk 5, and the ring gear 6, the rotor 7, the rotor guide 8, the compression side and combustion side jet-check-valves 31 and 32, the combustion side jet-check-valve automatic opening/closing lock valve 66 and the like are provided, or provided into a complete combustion system unit 65, and the side housing 60, and each is fixed to the housing main body 1 (61).

Note, in the complete combustion engine of this embodiment, the above description is also applied also in the sixth embodiment without describing details for the members in common with the structures of the implosion compression engine, the heat difference or implosion engines.

Next, a manufacturing method of the complete combustion engine of this sixth embodiment will be described. The housing 1 (61), the inner peripheral wall surface circular doughnut-shaped cylinder, a through port for the output shaft unit 2 is finished by lathe in the circular inner peripheral wall surface and an inner end surface. An exhaust duct along movement of an outlet from about 1 o'clock to about 5 o'clock in the housing inner end surface and an exhaust port to the outside at about 4 o'clock are machined.

For the housing main body 1 (61) or the system unit 65, in order to connect an intake/combustion side cylinder and a compression/exhaust side cylinder cut off by the rotor 7, by a bypass, the sub combustion chamber S is provided in the middle by milling without being in contact with the outer periphery of the rotor 7, a combustion gas Jet orifice into the rotor is drilled, and a head portion of the sub combustion chamber S is attached or an attaching portion for the complete combustion system unit 65 is provided.

The output shaft unit 2, the pistons 64(A) and 64(B) and the output disk 3 are finished by lathe and milling, and an outlet is machined in the preceding-side output disk 3 of the piston 64(A). An inlet is machined on the following side of the piston 64(A) of the ring disk 5.

The rotor 7 and the rotor shaft 17 are both finished by lathe.
A space for accommodating piston and its edge are finished by milling.

The rotor guide 8 is finishing by three-stages of outer diameter by lathe. First, the outer diameter and the width are made in planar contact with the side surface of the ring disk 5 without being in contact with the ring gear inner diameter, then, the outer diameter and the width in planar contact with the inner diameter of the ring disk 5 are made in planar contact with the side surface of the piston, and finally, finishing is performed by the outer diameter and the width in planar contact with the inner diameter of the piston. The rotor shaft through port and the outer diameter for holding the concentric rotor outer diameter planar contact are finished by lathe and milling. On the opposite side, a space for installing a sync gear 9 for rotor synchronization is machined.

At an entrance for a bypass portion of the main body or the system unit, a space for providing a jet-check-valve for preventing a backflow of the gas is created. Regarding the compression side jet-check-valve 31, the combustion injection side jet-check-valve 32, and its automatic opening/closing lock-valve 66, a space for providing the lock-valve is provided and at the same time, the fuel injection nozzle attaching portion is finished by milling.

Regarding the side housing 60, the inner end flat surface is finished by lathe and the intake port and the intake duct are machined by milling, and a through port for the rotor shaft 17 is machined. The intake port is finished from the outside.

Next, the operation principle of this sixth embodiment, that is, the 1/6 cycle complete combustion jet engine will be described.

Figure 10:
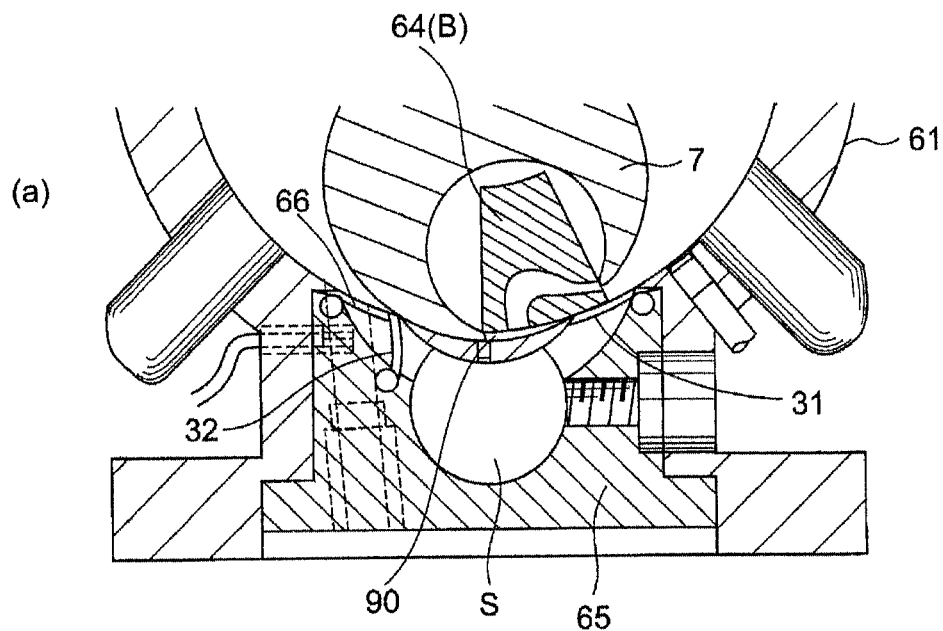
FIG. 10, FIG. 11 and FIG. 12 are the partial sectional view illustrating a part of the operation stroke of a complete combustion engine of a sixth embodiment according to the present invention.
Figure 10:
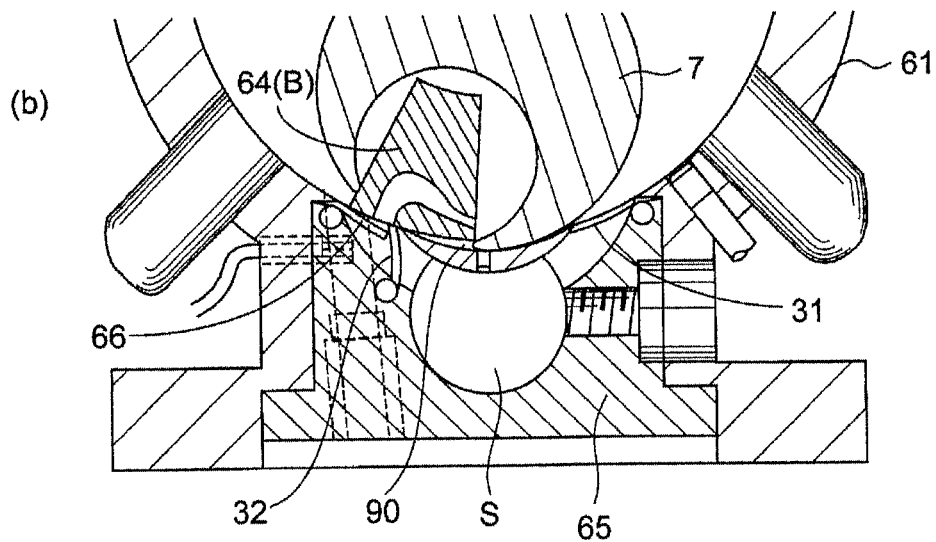
Figure 11:
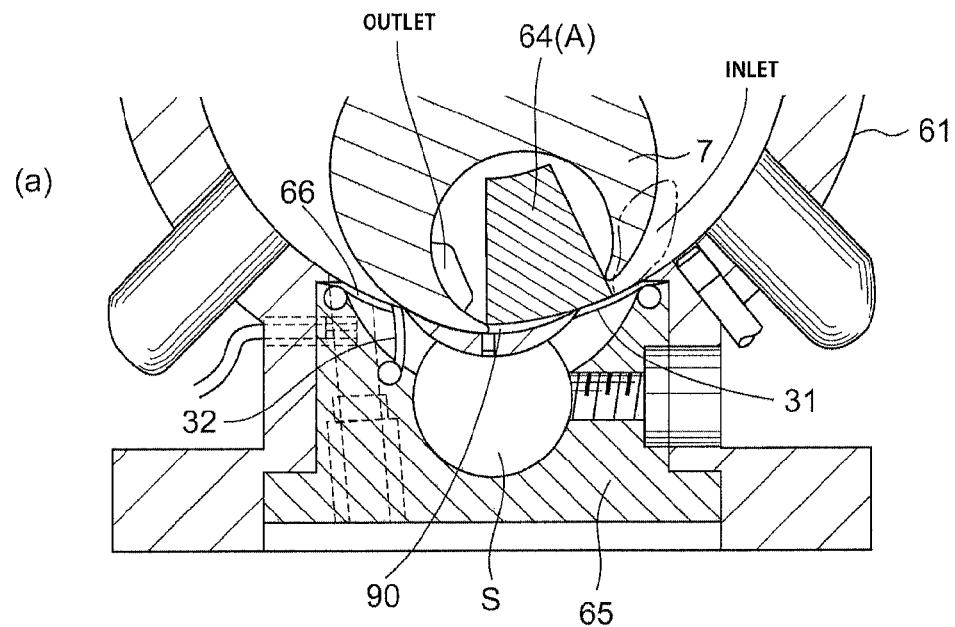
Figure 11:
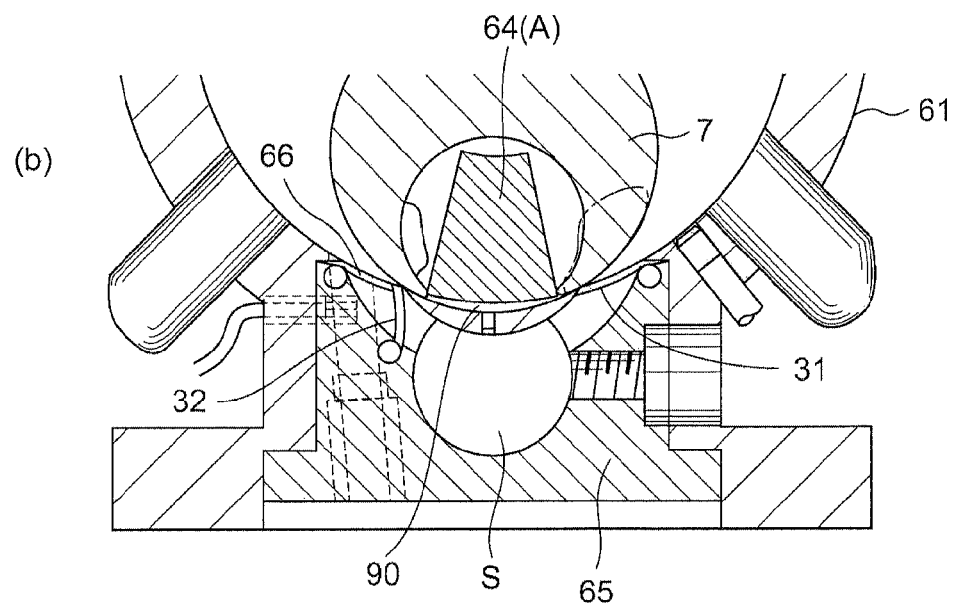
Figure 12:
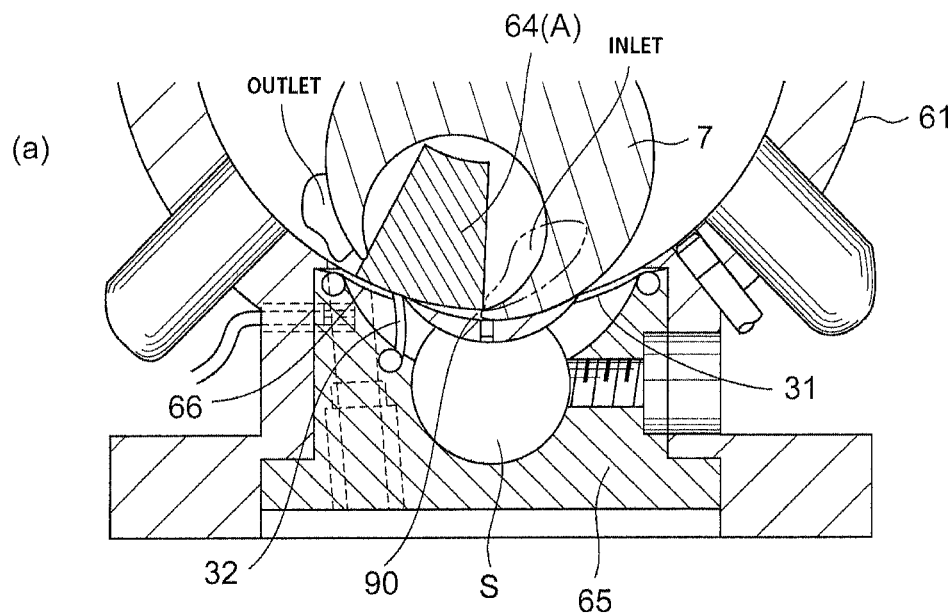
Figure 12:
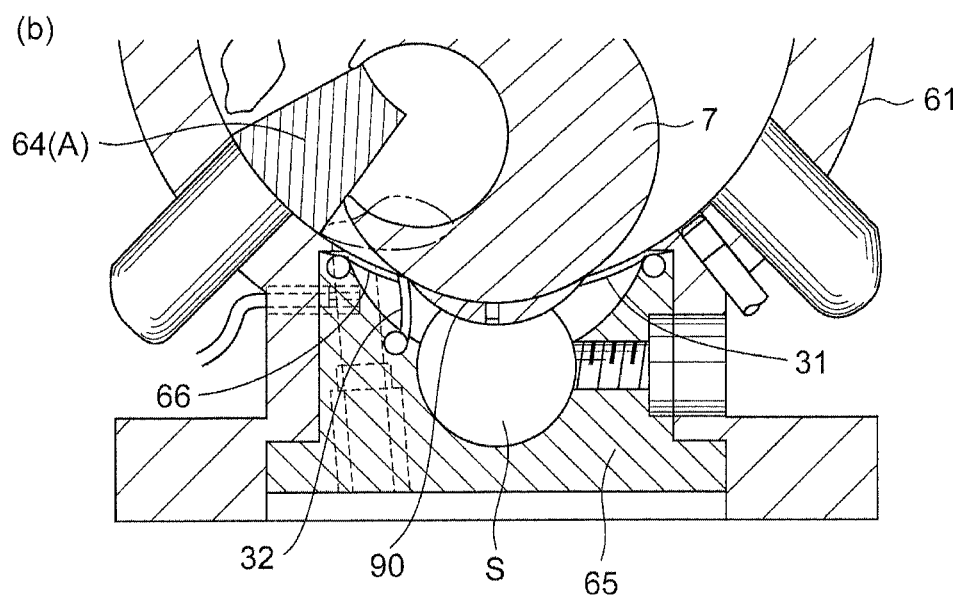

First, the piston 64(A) is in charge of exhaust on the preceding side and intake on the following side, while the piston 64(B) is in charge of compression on the preceding side and combustion on the following side (See FIGS. 10 to 12).

The intake stroke (1) by the piston 64(A) having finished exhaust starts past 6 o'clock and lasts over approximately 240 degrees, and the air having entered the space of the intake duct in the side housing through the intake port of the side housing 60 and sucked into the rotor 7 and the doughnut-shaped cylinder through the inlet of the ring disk 5 located on the following side of the piston 64(A) is subjected to injection of the fuel from the fuel injection nozzle and becomes a mixture, and at past 12 o'clock, completely gasified in the subsequent complete gasification stroke (2) [approximately 120 degrees] in a form sandwiched by the piston 64(B), and a part of it in the rotor 7 and the piston 64(B) in the compression stroke (3) [approximately 240 degrees] while the most of it is compressed and ignited in the sub combustion chamber S in the bypass. In this embodiment, a homogeneous-charge compression ignition (HCCI) is assumed, but there is naturally no problem with plug ignition or direct injection of the diesel fuel in the sub combustion chamber. As described above, in the present invention, the homogeneous-charge compression ignition, ignition plug, in the sub combustion chamber, direct injection and the like can be employed, but employment of the homogeneous-charge compression ignition assisted by a glow plug only at start seems to be the most promising particularly from the viewpoint of a cost. Current attempt by using the 4-cycle reciprocating engine seems to be difficult but it seems to be realized easily with this 1/6 cycle complete combustion jet engine having reliable pressure boundary and operation without overlap.

Here, the characteristics of this embodiment will be described in more detail by referring to the drawings. FIG. 10(*a*) illustrates an instant when the 1/6-cycle compression ends and ignition combustion just starts and the Ejection hole of the sub combustion chamber closed by the rotor 7 is to be opened, while a tunnel port at the rear end of the piston 64(B) is to be closed at the same time. Immediately after that, the gas at stormed through the Ejection hole. FIG. 10(*b*) illustrates an instant when the Ejection hole of the sub combustion chamber is closed, and the combustion gas from the rotor 7 is Ejection backward to the lock valve 66 from the tunnel port on the outer periphery of the piston 64(B) so as to unlock the valve. When the combustion Ejection jet-check-valve 32 is opened, the tunnel port on the outer periphery of the piston 64(B) is closed by the cylinder outer periphery. FIG. 11(*a*) illustrates an instant when the Ejection hole of the sub combustion chamber is opened a moment before the final exhaust stroke and the sub combustion chamber S is exhausted, while the combustion Ejection jet-check-valve 32 is closed. FIG. 11(*b*) illustrates an instant when the rotor 7 space becomes the minimum.

FIG. 12(a) illustrates an instant when the Ejection hole of the sub combustion chamber is closed, and even if there remains a pressure in the sub combustion chamber S, it can be no longer exhausted and the Ejection hole is closed, while air starts to be newly taken into the rotor 7 at the same time. FIG. 12(b) illustrates an instant when the air also starts to be taken into the doughnut cylinder.

Ideally, the combustion stroke starts from the position before 6 o'clock, a part of the combustion gas pressure is made to enter directly into the rotor 7 at stormed instantly through the ejection hole provided in the sub combustion chamber S and into the rotor 7 through the tunnel inside the piston 64(B), and by also combusting the gas in the rotor 7, it is made to act so that the piston 64(B) is pushed out of the rotor 7. When the piston 64(B) passes by 7 o'clock, the combustion gas in the rotor 7 is ejected backward to open from the tunnel inside the piston 64(B) to the automatic opening/closing lock valve 66 and then, the combustion ejection jet-check-valve 32 is opened, whereby most of the combustion takes place in the doughnut cylinder and continues to effectively work to the output shaft orthogonally for approximately 240 degrees all the time.

After that, the complete combustion=detoxifying stroke reaches 120 degrees, and then, the gas is exhausted from the outlet located in the preceding-side output disk of the piston 64(A) through the exhaust port via the exhaust duct provided in the housing end surface, which forms an output stroke 5 times or more of the reciprocating piston type (approximately 45 degrees in the internal combustion engine) and is estimated to achieve performance/efficiency at least 5 times or more or 10 times in combination with a synergic effect of the excellent combustion efficiency, mechanical efficiency and the like.

It should be noted, In the complete combustion engine of the present invention, a dedicated cylinder including the above-described intake stroke (1), the complete gasification stroke (2), and the compression stroke (3) and a dedicated cylinder including the combustion stroke (4), the complete combustion=detoxifying stroke (5), and the exhaust stroke (6) can be separated and made independent from each other. That is exactly the structure of the jet engine, which can be formed by adding one pair of the piston and the rotor to the W-type cylinder and by providing the bypass and the sub combustion chamber between them. This will be described in detail in the seventh embodiment.

Moreover, the complete combustion engine of this sixth embodiment is, unlike the current jet engine (speed-type), the output disk 3, the piston 4, the ring disk 5, the ring gear 6, the rotor 7, and the rotor guide 8 are designed so that no pressure leakage occurs and all the pressure boundaries are composed of planar contact, and perfect sealing is realized and thus, there is no pressure leakage at all and the combustion gas pressure does not leak wastefully. By incorporating these two moving parts and the rotor guide in the doughnut-shaped cylinder, the 21st century (SV/ICR/ICE type), jet combustion type 1/6-cycle multiple fuel complete combustion jet engine of this embodiment is completed.

The complete combustion engine of this sixth embodiment generates a large torque from low-speed idling at approximately 6 to 60 rpm, which is $1/10$ to $1/100$ of the current reciprocating engine and falls under the idling limit of MYT engine, and thus, multi transmission gear is not needed, and the engine is promising as a motor for various machines. Moreover, since the effective output stroke has approximately 240 degrees in 360 degrees, this is a highly efficient engine 5 times or more of the current reciprocating engine. There is no problem in structure in reaching a high-speed rotation and high-output region equal to the jet engine. The rotation limit in the current volume type piston crank internal combustion engine is far exceeded both in a low speed area and a high speed area, and moreover, this complete combustion jet engine has no pressure leakage at all and can convert all the combustion gas pressure to the rotation force.

Moreover, inertia is not cancelled but all the inertia work in the rotation direction without a waste and boasts an excellent mechanical efficiency, and the output increases substantially in proportion to the displacement and rotation speed.

This sixth embodiment has realized the maximum simplification as the 21st century speed-type jet engine, and further omission/simplification seems impossible.

The two moving parts required for manufacture of the complete combustion jet engine have simple structures and do not require special machining and can be easily manufactured.

The complete combustion engine of this sixth embodiment has the following (1), (2), and (3) indispensable constituent requirements and the following requirements as effective constituent requirements:

(1) Operates only by isokinetic circular rotation;
(2) Complete compression is ensured;
(3) And the force of the piston directly works to the output shaft at a right angle and gives a rotation force.

Moreover, the facts that a valve mechanism and the like are not necessary, a fly wheel is not necessary and the like are not the indispensable constituent requirements but effective points.

According to this sixth embodiment, this engine functions as a Prime mover for anything as the 21st century (SV/ICR/ICE type), jet combustion multiple fuel complete combustion jet engine taking place of the reciprocating engine and the jet engine which are still actively working at present.

For example, this is a complete combustion jet engine that can realize small size, light weight, low price, high torque, high output, fuel cost saving, low maintenance cost and moreover, low pollution with efficiency/performance 5 times or more for super-small sized model, lawn mower, bicycle with motor, large-sized motorcycle, light car, normal car, large-sized truck, bus, outboard engine, boat, yacht, large-sized ship, post nuclear plant/power generation, ultra-light sports machine, small-sized private aircraft, short-distance commuter, international commercial aircraft and any other applications requiring a engine.

This operates only by complete circular motion like a (known) motor that can be easily understood even by the general public. Simple and clear ideals of small size, light weight, high torque, high output, fuel-cost saving, and low pollution with a simple mechanism which are exactly the opposite to the current jet engine are realized with no roar, high-temperature exhaust, super-high speed rotation high output, large-quantity fuel consumption and the like at all. This sixth embodiment enables aiming at efficiency of 5 times or more and 10 times by the paradigm shift from the prior-art technologies.

[Seventh Embodiment]

A seventh embodiment of the present invention is formed as a (SV/ICR/ICE type), jet combustion 2/6 cycle multiple diversified fuel continuous complete combustion jet engine. In the continuous complete combustion engine, the dedicated cylinder including the intake stroke (1), the complete gasification stroke (2), and the compression stroke (3) in the above-described sixth embodiment and the dedicated cylinder including the combustion stroke (4), the complete combustion=detoxifying stroke (5), and the exhaust stroke (6) are separated from each other and formed as independent cylinders. In other words, this is exactly the structure of the jet engine, which can be formed by adding one pair of the piston and the rotor to the twin-type cylinder and by providing the bypass and the sub combustion chamber between them. The performance efficiency reaches twice the 1/6 cycle and is of a high performance type.

The final target of (10-times performance efficiency) can be achieved in comparison with the current reciprocating engine can be achieved substantially reliably with this type.

The jet-check-valve and the like are no longer necessary, and the fact that this engine is exactly the 21st century jet engine and can be verified and felt by its continuous combustion.

This engine can be also formed by using two 1/3 cycles and by providing a bypass sub combustion chamber.

This seventh embodiment is composed of the following components (the entirety is not shown). Those other than the structure specific to this seventh embodiment are basically the same as those in the above-described embodiments.

(1) For 2/6 cycle continuous complete combustion engine and cylinder housing twin;
(2) For 2 connection twin for output shaft unit continuous complete combustion;
(3) For system unit twin cylinder connection type for continuous complete combustion;
(4) 2 connection twin rotor;
(5) 2 connection twin rotor guide;
(6) Bypass sub combustion chamber=for twin cylinder connection type;
(7) Side housing for continuous complete combustion.

The continuous complete combustion engine of this seventh embodiment has the above-described basic configuration and moreover, the 1/6 cycle configured as a single cylinder is separated to two dedicated cylinders on the compression side and the combustion side and returned to the original form.

The twin cylinder 2/6 cycle is original basic, in which the compression dedicated side cylinder, the system unit with a sub combustion chamber, and the combustion dedicated side cylinder having the same configuration as the current jet engine are connected, and is a (SV/ICR/ICE type), jet combustion type open 2/6 cycle multiple diversified fuel continuous complete combustion jet engine pump, characterized in that driving means including a stroke for giving a rotation operation to the piston including an output stroke twice the 1/6 cycle is provided.

It is needless to say that this twin cylinder model can be extended to all the types.

As a pump, this type can be extended to all the types.

[Other Embodiments]

The engine pump according to the present invention can be a (pressure) engine in the above-described first embodiment, an (implosion) engine in the second embodiment, a (heat difference) engine in the third embodiment, an (implosion compression) engine in the fourth embodiment, a (general 4-cycle) engine in the fifth embodiment, an (intake/complete gasification/compression/combustion/complete combustion=detoxifying/exhaust) complete combustion engine in the sixth embodiment, a 2/6-cycle (continuous complete combustion=detoxifying) engine in the seventh embodiment, and its combination or can be a changed embodiment within a range of the present invention, can handle any fuel or energy source and can solve any environment/energy problems.

Here, an inner rotor type with an emphasis on size reduction has been described, but if a large output device needs to be installed in a limited elongated space, an outer rotor type can be used.

This type has a normal outer-tooth gear combination as compared to the combination of internal-tooth gears and is excellent in connection performance and can be easily composed of serial multi-cylinders, only the rotor can be removed, maintenance performance is favorable, and manufacture is easier, though it is bulky in a single form. Moreover, it can be basically formed by changing the current combination of gears.

Moreover, the inner rotor type is considered to be suitable for a twin cylinder but can be also connected to more multiple cylinders.

The 2-piston/2-rotor which cannot be used in a ring gear type can be also used in the inner rotor type by installing a sync gear inside the output shaft disk, and connection is also possible.

With the 3-piston/1&2 rotor 1/3, 2/3, and 2/6 stroke dedicated and 4-piston/2-rotor, torque fluctuation can be suppressed, and connection becomes unlimited, but complete overhaul takes labor in disassembling and maintenance later. In the case of the external rotor type, only the rotor can be removed and the inside can be inspected. This point is excellent in the large-sized type.

Industrial Applicability

In the present invention, since there is no pressure leakage, increased/decreased pressure is all used immediately as a rotation torque and worked. It has industrial applicability as various types of engines and pumps as (SV/ICR/ICE type), rocket jet combustion type excellent in rotation speed limit performance both at a high speed and a low speed and the like.

The present invention can be particularly used as (1) 1/3 cycle ((SV/ICR/ICE type), external pressure external type engine, (2) 2/3 cycle (SV/ICR/ICE type), rocket combustion type, (HHO explosion/constant volume/vacuum contraction) implosion rocket engine, (3) 2/3 cycle (SV/ICR/ICE type), external combustion type (expansion/constant volume/contraction) heat difference engine, (4) 2/3 cycle (SV/ICR/ICE type), rocket combustion type, (HHO explosion/constant volume/vacuum contraction injection compression) implosion compression rocket engine, (5) 1/4/4 cycle (SV/ICR/ICE type), jet combustion type (general 4 cycle) jet engine, (6) 1/6 cycle (SV/ICR/ICE type), jet combustion type, multiple fuel complete combustion jet engine, (7) 2/6 cycle (SV/ICR/ICE type), jet combustion type multiple diversified fuel continuous complete combustion jet engine and the like.

REFERENCE SIGNS LIST

1=housing (cylinder)
2=output shaft unit=(output disk 3+piston 4+ring disk 5+ring gear 6 are integrated)
3=output disk
4=piston [4(A), 4(B)]
5=ring disk
6=ring gear
7=rotor
8=rotor guide (3-staged outer diameter)
9=sync gear
11=pressure introduction port
12=pressure outlet
13=cylinder inner peripheral wall surface
14=cylinder notch portion for rotor planar contact
18=rotor guide wall portion (3-staged outer diameter)
19=1/3-cycle pressure engine 30=2/3-cycle heat difference engine
31=low-temperature jet-check-valve (compression side) (It is shown with "check-valve" simply in the drawings.)
32=high-temperature jet-check-valve (combustion side) (It is shown with "check-valve" simply in the drawings.)
33=bypass buffer chamber
35=system unit for heat difference
36=low-temperature-conductor
37=high-temperature-conductor
40=2/3-cycle implosion compression engine
21=high-pressure HHO injection nozzle
22=glow ignition plug
41=low-pressure HHO injection nozzle
42=H₂O recovery pipeline
45=system unit for implosion compression
61=1/6-cycle complete combustion engine and cylinder housing
64=piston A/B for complete combustion
65=system unit for complete combustion
66=automatic opening/closing lock valve, for high-temperature jet-check-valve
S=bypass sub combustion chamber
90=gap
91=(various) system unit

The invention claimed is:

1. A rotary device comprising at least:
a housing having a cylinder space;
an output shaft unit comprising an output shaft, one or two or more pistons, a ring disk, and an output disk configured to make an isokinetic circular rotation in said cylinder space;
a rotor configured to make the isokinetic circular rotation with respect to the rotation of said piston; and
a rotor guide in the cylinder space having an arc-shaped notch portion being in contact with said rotor and a planar contact outer peripheral surface with said piston, and supporting the center of said output shaft unit and said rotor making the isokinetic circular rotation, wherein
the cylinder of said housing has a notch portion for sealing in planar contact with a part of the outer peripheral surface of said rotor at a part of an inner peripheral wall surface thereof;
the piston of said output shaft unit is configured such that its outer peripheral surface makes the isokinetic circular rotation while in planar contact with the inner peripheral wall surface of said cylinder;
the rotor has a recessed portion for accommodating the piston as viewed in a direction parallel to an axis of the output shaft of the output shaft unit;
as viewed in a direction parallel to the axis of the output shaft of the output shaft unit, an outer shape of a cross-section of the rotor is a portion of a first circle, an outer shape of a cross-section of the recessed portion of the rotor is a portion of a second circle, a diameter of the first circle is larger than a diameter of the second circle, a center of the first circle is not at the same place as a center of the second circle, and a rotor shaft of the rotor is located at a position that is lower than the output shaft of the output shaft unit and higher than the notch portion;
the rotor is during rotation configured to engage with the piston so that distal ends of the recessed portion of the rotor have respectively a pressure boundary by linear contact with a front surface and a rear surface of the piston at the same time with respect to the advancing direction of the piston; and
the piston has its inside being hollow, and two holes connected to the hollow are respectively provided in a rear part of the piston with respect to an advancing direction of the piston and the outer peripheral surface of the piston.

2. The rotary device according to claim 1, wherein the distal end of the recessed portion of the rotor is located where the first and second circles intersect.

3. A rotary device comprising at least:
a housing having a cylinder space;
an output shaft unit composed of an output shaft, one or two or more pistons, a ring disk, and an output disk configured to make an isokinetic circular rotation in said cylinder space;
a rotor configured to make the isokinetic circular rotation at a constant rotation specific speed with respect to the rotation of said piston;
a rotor guide having the same center as said output shaft unit and in charge of the inside of said cylinder, having an arc-shaped notch portion being in contact with said rotor and a planar contact outer peripheral surface being in contact with said piston, and supporting the center of said output shaft unit and said rotor making the isokinetic circular rotation; and
driving means giving an operation to said piston, wherein
the cylinder of said housing has a notch portion for sealing in planar contact with a part of the outer peripheral surface of said rotor at a part of an inner peripheral wall surface thereof;
the piston of said output shaft unit is configured such that its outer peripheral surface makes the isokinetic circular rotation while in planar contact with the inner peripheral wall surface of said cylinder;
the rotor has a recessed portion for accommodating the piston during the rotation thereof and is configured to engage with the piston and to rotate while a distal end of the recessed portion keeps a pressure boundary by linear contact with a front-and-rear surface in an advancing direction of the piston and in linear contact with the front-and-rear surface and to send the piston to the other side of the cylinder;
as viewed in a direction parallel to an axis of the output shaft of the output shaft unit, an outer shape of a cross-section of the rotor is a portion of a first circle, an outer shape of a cross-section of the recessed portion of the rotor is a portion of a second circle, a diameter of the first circle is larger than a diameter of the second circle, a center of the first circle is not at the same place as a center of the second circle, and a rotor shaft of the rotor is located at a position that is lower than the output shaft of the output shaft unit and higher than the notch portion; and
the piston has its inside being hollow, and two holes connected to the hollow, and the two holes are respectively located in a rear part of the piston with respect to the advancing direction of the piston and the outer peripheral surface of the piston.

4. The rotary device according to claim 3, wherein the piston of the output shaft unit has a shape expanded from the center of the output disk and a force working on the piston works at a right angle on the output shaft of the output shaft unit all the time.

5. The rotary device according to claim 3, wherein a bypass leading to the both sides of the cylinder shut off by the rotor is provided on the both outsides of the notch portion in the cylinder of the housing.

6. The rotary device according to claim 5, wherein
check valves for preventing a backflow of a fluid in the cylinder are provided at an inlet and an outlet of the bypass, respectively.

7. The rotary device according to claim 5, wherein
a low-temperature-conductor is attached to the vicinity of the inlet of the bypass and a high-temperature-conductor to the vicinity of the outlet of the bypass in the cylinder inner peripheral wall.

8. The rotary device according to claim 3, wherein
the driving means is a system unit provided at a position within a range not exceeding a length of an outer peripheral surface of the piston from a boundary portion where the rotor is in planar contact with the cylinder wall surface.

9. The rotary device according to claim 3, wherein
a buffer chamber is provided in the middle between the inlet and the outlet of the bypass.

10. The rotary device according to claim 3, wherein the rotary device is one of a rocket combustion engine, a jet combustion engine, and an internal combustion engine.

11. An engine system characterized by including at least the rotary device described in claim 3.

12. The rotary device according to claim 3, wherein
the distal end of the recessed portion of the rotor is located where the first and second circles intersect.

13. The rotary device according to claim 3, wherein
an outer peripheral diameter of the rotor is larger than a half of an outer peripheral diameter of the piston.

14. A rotary device comprising:
a housing having a cylinder space;
an output shaft unit comprising an output shaft, and two or more pistons;
a rotor configured to make the isokinetic circular rotation with respect to the rotation of said piston; and
a rotor guide in the cylinder space having an arc-shaped notch portion being in contact with said rotor and a planar contact outer peripheral surface with said piston, and supporting the center of said output shaft unit and said rotor making the isokinetic circular rotation, wherein
the cylinder of said housing has a notch portion for sealing in planar contact with a part of the outer peripheral surface of said rotor at a part of an inner peripheral wall surface thereof;
the piston is configured such that an outer peripheral surface of the piston makes the isokinetic circular rotation while in planar contact with the inner peripheral wall surface of said cylinder;
the rotor has a recessed portion for accommodating the piston during the rotation of the rotor as viewed in a direction parallel to an axis of the output shaft of the output shaft unit;
the rotor is during rotation configured to engage with the piston so that distal ends of the recessed portion of the rotor have respectively a pressure boundary by linear contact with a front surface and a rear surface of the piston at the same time with respect to the advancing direction of the piston;
as viewed in a direction parallel to the axis of the output shaft of the output shaft unit, an outer shape of a cross-section of the rotor is a portion of a first circle, an outer shape of a cross-section of the recessed portion of the rotor is a portion of a second circle, a diameter of the first circle is larger than a diameter of the second circle, a center of the first circle is not at the same place as a center of the second circle, and a rotor shaft of the rotor is located at a position that is lower than the output shaft of the output shaft unit and higher than the notch portion;
an outer peripheral diameter of the rotor is larger than a half of an outer peripheral diameter of the piston; and
the piston has its inside being hollow, and two holes connected to the hollow are respectively located in a rear part of the piston with respect to an advancing direction of the piston and the outer peripheral surface of the piston.

15. The rotary device according to claim 14, wherein the distal end of the recessed portion of the rotor is located where the first and second circles intersect.

16. A rocket combustion or jet combustion internal combustion engine or an internal combustion, rocket or jet engine comprising a rotary device, the rotary device comprising at least:
a housing having a cylinder space;
an output shaft unit composed of an output shaft, one or two or more pistons, a ring disk, and an output disk configured to make an isokinetic circular rotation in said cylinder space;
a rotor configured to make the isokinetic circular rotation at a constant rotation specific speed with respect to the rotation of said piston;
a rotor guide having the same center as said output shaft unit and in charge of the inside of said cylinder, having an arc-shaped notch portion being in contact with said rotor and a planar contact outer peripheral surface being in contact with said piston, and supporting the center of said output shaft unit and said rotor making the isokinetic circular rotation; and
driving means giving an operation to said piston, wherein
the cylinder of said housing has a notch portion for sealing in planar contact with a part of the outer peripheral surface of said rotor at a part of an inner peripheral wall surface thereof;
the piston of said output shaft unit is configured such that its outer peripheral surface makes the isokinetic circular rotation while in planar contact with the inner peripheral wall surface of said cylinder;
the rotor has a recessed portion for accommodating the piston during the rotation thereof and is configured to engage with the piston and to rotate while a distal end of the recessed portion keeps a pressure boundary by linear contact with a front-and-rear surface in an advancing direction of the piston and in linear contact with the front-and-rear surface and to send the piston to the other side of the cylinder;
as viewed in a direction parallel to an axis of the output shaft of the output shaft unit, an outer shape of a cross-section of the rotor is a portion of a first circle, an outer shape of a cross-section of the recessed portion of the rotor is a portion of a second circle, a diameter of the first circle is larger than a diameter of the second circle, a center of the first circle is not at the same place as a center of the second circle, and a rotor shaft of the rotor is located at a position that is lower than the output shaft of the output shaft unit and higher than the notch portion; and
the piston has its inside being hollow, and two holes connected to the hollow, and the two holes are respectively located in a rear part of the piston with respect to the advancing direction of the piston and the outer peripheral surface of the piston.

* * * * *